(12) United States Patent
Braun

(10) Patent No.: US 7,339,469 B2
(45) Date of Patent: Mar. 4, 2008

(54) SHIPPING CONTAINER MONITORING AND TRACKING SYSTEM

(75) Inventor: Cynthia Marie Braun, Branchville, NJ (US)

(73) Assignee: Maersk Logistics USA, Inc., Wilmington, DE (US)

( * ) Notice: Subject to any disclaimer, the term of this patent is extended or adjusted under 35 U.S.C. 154(b) by 198 days.

(21) Appl. No.: 10/994,781

(22) Filed: Nov. 22, 2004

(65) Prior Publication Data

US 2006/0109106 A1    May 25, 2006

(51) Int. Cl.
*G08B 1/08* (2006.01)
(52) U.S. Cl. .................. 340/539.13; 701/215; 235/385
(58) Field of Classification Search ............ 340/539.13
See application file for complete search history.

(56) References Cited

U.S. PATENT DOCUMENTS

| | | | |
|---|---|---|---|
| 5,959,568 A | 9/1999 | Woolley et al. | |
| 6,148,291 A | 11/2000 | Radican | |
| 6,429,810 B1 | 8/2002 | De Roche | |
| 6,611,686 B1 | 8/2003 | Smith et al. | |
| 6,735,630 B1 | 5/2004 | Gelvin et al. | |
| 6,748,320 B2 | 6/2004 | Jones | |
| 6,882,274 B2 * | 4/2005 | Richardson et al. | ... 340/539.13 |
| 2002/0177476 A1 | 11/2002 | Hong | |
| 2003/0227382 A1 * | 12/2003 | Breed | ..... 340/539.13 |
| 2004/0000586 A1 | 1/2004 | White | |
| 2004/0024660 A1 | 2/2004 | Ganesh et al. | |
| 2004/0100379 A1 * | 5/2004 | Boman et al. | ......... 340/539.26 |
| 2004/0113783 A1 | 6/2004 | Yagesh | |
| 2004/0227630 A1 * | 11/2004 | Shannon et al. | ........ 340/539.22 |
| 2006/0099959 A1 * | 5/2006 | Staton et al. | ............. 455/456.1 |
| 2006/0100777 A1 * | 5/2006 | Staton et al. | ................ 701/200 |
| 2006/0109107 A1 * | 5/2006 | Staton et al. | ........... 340/539.13 |

FOREIGN PATENT DOCUMENTS

| | | |
|---|---|---|
| WO | WO 03023439 A | 3/2003 |
| WO | WO 2004077091 A | 9/2004 |

* cited by examiner

*Primary Examiner*—George Bugg
(74) *Attorney, Agent, or Firm*—Bryan Cave, LLP

(57) ABSTRACT

The invention provides a system for monitoring a container for transporting cargo. The system includes an onboard device attached to the container and a central computer system. The central computer system processes alerts transmitted by the onboard device. The onboard device includes a processor/sensor component and an antenna component. The processor/sensor component comprises a processor for controlling the device. The processor/sensor component also includes one or more sensor in communication with the processor for sensing container conditions. A satellite modem in the processor/sensor component transmits alerts relating to container conditions and other satellite communications. The antenna component includes a satellite antenna, which is connected to the satellite modem.

6 Claims, 21 Drawing Sheets

SHIPPING CONTAINER MONITORING AND TRACKING SYSTEM

BACKGROUND OF THE INVENTION

The present invention relates generally to the field of container shipping, and particularly to methods and systems for monitoring and tracking containers and cargo during transportation.

Intermodal container shipping involves the shipment of various commodities in a container from an origin to a destination using multiple modes of transportation such as trucks, trains, barges, feeder vessels, ocean-going ships, and planes. The shipping industry uses standardized containers, which can be mounted on wheeled chassis for truck transportation. These standard containers have two doors at the rear, which can be opened and closed using externally-mounted camshaft levers.

Today, securing container doors generally involves attaching a numbered seal to the door's camshaft lever. The seal can take the form of a bolt, a plastic tie, or an electronic seal, which stores information for later retrieval. Conventional methods of tracking containers typically involve logging of container arrivals and departures from designated facilities. Even the newer electronic seals do not communicate security alerts until after a container arrives at a facility where readers are available. Because conventional security measures do not include real-time alerts, containers protected with conventional seals are vulnerable to tampering or breach during transit.

Following the tragic events of Sep. 11, 2001, there have been several attempts to address container security issues. For example, Boman et al., U.S. Patent Application Publication No. 2004/0100379, discloses a system for monitoring the security of intermodal freight containers. The system comprises a monitoring device, reader, server and software backbone. The monitoring device includes one or more sensors for determining if a security condition has occurred. The sensors are capable of detecting temperature, vibration, radioactivity, gas or motion. The device communicates with a fixed or mobile reader in order to determine the security and location of the container to which the device is attached. The reader electronically transmits the information from the device to the server.

However, the Boman system has a number of disadvantages that make it impractical for most conventional intermodal shipping applications. For example, the monitoring device attached to the container does not have the capability to communicate directly with the software backbone. Rather, it communicates via a separate fixed or mobile reader using a short-range, low power radio system. The reader serves as a relay station between the monitoring device and the server. Thus, the monitoring device must be in close proximity to a reader in order to transmit alert signals to the software backbone. For example, as illustrated in FIG. 6 of Boman, a reader 16 must be installed on the cargo ship to allow the monitoring devices attached to the containers to communicate via satellite during transit. The positioning of reader devices throughout the transit route is impractical. For example, many carriers would not permit such reader devices to be even temporarily installed for a variety of reasons, including concern that such radio communications devices would interfere with critical shipboard radio communications. In addition, the installation of reader devices on other modes of transportation, such as trucks, trains, barges, feeder vessels and planes would be prohibitively expensive.

Yagesh, U.S. Patent Application Publication No. 2004/0113783, discloses an intermodal threat identification, detection, and notification transportation security system. The Yagesh system includes a container locking seal configured to be removably coupled to a freight shipping container. The seal includes sensors capable of detecting, container conditions, such as temperature, seal tampering, etc. The Yagesh system may be used to monitor the actual position of a cargo vehicle to determine whether the actual position of the vehicle corresponds to its predetermined route. An alarm condition is generated if the actual position of the vehicle does not correspond to the predetermined route.

Like the Boman monitoring device, the Yagesh locking device attached to the container is incapable of communicating directly with a computerized alarm monitoring system. Rather, the locking device must communicate with a nearby container state recorder (CSR). For example, as illustrated in FIG. 1 of Yagesh, a CSR must be installed onboard the vessel or vehicle on which the containers will be transported. As discussed above, such a solution is logistically impractical.

In addition, both the Boman and Yagesh systems do not provide useful cargo tracking and logistics functions. For example, both systems focus on the physical condition of container itself, and lack tools for processing and tracking data relating to the cargo within the container. Thus, these devices are generally limited to providing a security function and do not provide any useful cargo tracking and logistics functions.

For the foregoing reasons, there is a strong need for a system for monitoring and tracking containers and cargo during transportation that can monitor container conditions, track container position, and provide current logistics information relating to the cargo, which does not require installation reader devices to carry out communications. The present invention provides these and other advantageous results.

SUMMARY OF THE INVENTION

The present system provides a system for monitoring and tracking a container for transporting cargo. The system includes an onboard device attached to the container and a central computer system. The central computer system processes alerts transmitted by the onboard device and tracks the position of the onboard device. The onboard device includes a processor/sensor component and an antenna component. The processor/sensor component comprises a processor for controlling the device and a memory. The processor/sensor component also includes one or more sensors in communication with the processor for sensing container conditions. A satellite modem in the processor/sensor component transmits alerts relating to container conditions and other satellite communications. The antenna component includes a satellite antenna, which is connected to the satellite modem.

The onboard device can also include a global positioning system (GPS) receiver/antenna in communication with the processor for determining the position of the device.

In one embodiment, the onboard device further comprises a short-range wireless communications module and RF antenna for transmitting and receiving short-range radio-frequency (RF) communications and/or a cellular telephone modem/antenna in communication with the processor for transmitting and receiving cellular telephone communications comprising alerts relating to container conditions. The processor can be programmed to select a mode of communications from multiple modes of wireless communications comprising satellite communications, cellular telephone communications, and short-range wireless communications based upon one or more rules.

In one embodiment, the onboard device includes a rechargeable battery and a solar panel for recharging the battery.

The system can also include one or more fixed communications devices for creating a communications hotspot to facilitate communications between the onboard device and the central computer system. Each fixed communications device preferably includes a processor for controlling the fixed communication device. A short-range wireless communications module for transmits and receives short-range RF communications between the fixed communications device and the onboard device. A cellular modem and cellular telephone antenna for transmitting and receiving communications between the fixed communications device and one or more external computing device via a computer network.

The system can also include one or more handheld computing devices in communication with the onboard device via short-range RF signals and the central computer system via a wired or wireless connection to a computer network. The handheld computing devices can control the mode of operation and update the onboard device. At least one of the handheld computing devices preferably includes a computer readable tag reader for reading the cargo information. The handheld computing device receives and correlates the container identification number and cargo information and transmits the correlated container identification number and cargo information to the central computer system.

BRIEF DESCRIPTION OF THE DRAWINGS

These and other features, aspects and advantages of the invention will become more fully apparent from the following detailed description, appended claims, and accompanying drawings where:

FIG. 9A is an example of a graphical user interface for displaying container tracking information in accordance with an embodiment of the invention;

FIG. 9B is an example of a graphical user interface for displaying details relating to a container being tracked in accordance with an embodiment of the invention;

FIG. 9I is an example of a graphical user interface for displaying shipping orders or purchase orders covering cargo shipped in containers tracked in accordance with an embodiment of the invention; and FIG. 9J is an example of a graphical user interface for displaying the details of a shipping order or purchase order covering cargo shipped in one or more containers tracked in accordance with an embodiment of the invention.

DETAILED DESCRIPTION OF THE INVENTION

Figure 1:
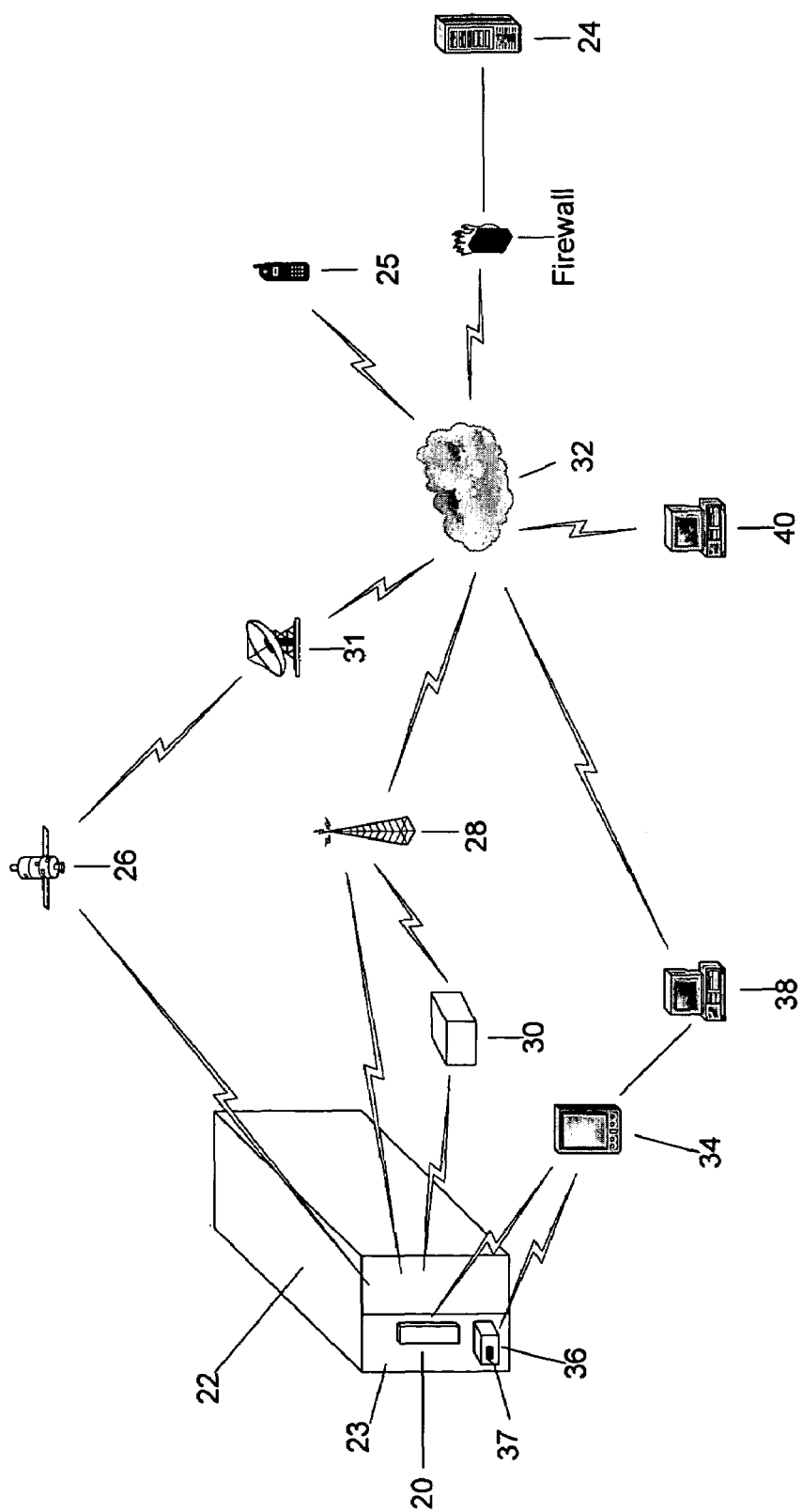
FIG. 1 is a diagram illustrating a shipping container monitoring and tracking system in accordance with an embodiment of the invention.

FIG. 1 illustrates an embodiment of a shipping container monitoring and tracking system in accordance with an embodiment of the invention. The principal components of the system are one or more onboard devices 20 (mounted to a shipping container 22), a central computer system 24, one or more handheld devices 34, and one or more fixed communications devices 30. The onboard device 20 tracks the position of the container 22 and monitors container integrity throughout its journey from origin to destination. The onboard device 20 can transmit location and container security information to the central computer system 24 via satellite 26. The satellite 26 communicates with the central computer 24 via a cell phone connection station 31 in communication with a computer network 32, such as the Internet. The onboard device 20 can also communicate by short-range wireless connection when it is within range of a fixed communications device 30. Each fixed communications device 30 use a cellular phone signal to connect to a cellular phone tower 28, which in turn communicates with the central computer 24 via computer network 32. Alternatively, the onboard device 20 can communicate directly by cellular telephone signal via a cellular telephone tower 28. The handheld device 34 is a portable computing device such as a personal digital assistance (PDA), which communicates with the onboard device 20 and central computer system 24. The handheld device 34 is used to initialize and update the onboard device 20.

Onboard Device

The onboard device 20 (sometimes referred to herein as an "intelligent tracking unit" or "ITU") is designed to fit most standard container doors. The mounting process can be easily performed by loading-dock personnel during the normal workflow process. It contains multiple communication components, which provide layered communications for transmitting and receiving information via cellular phone, satellite and short-range wireless connections. Communication of alerts, events and position data can be transmitted via satellite, cellular phone and short-range wireless modes depending on location and availability of the various means of communication.

Figure 2A:
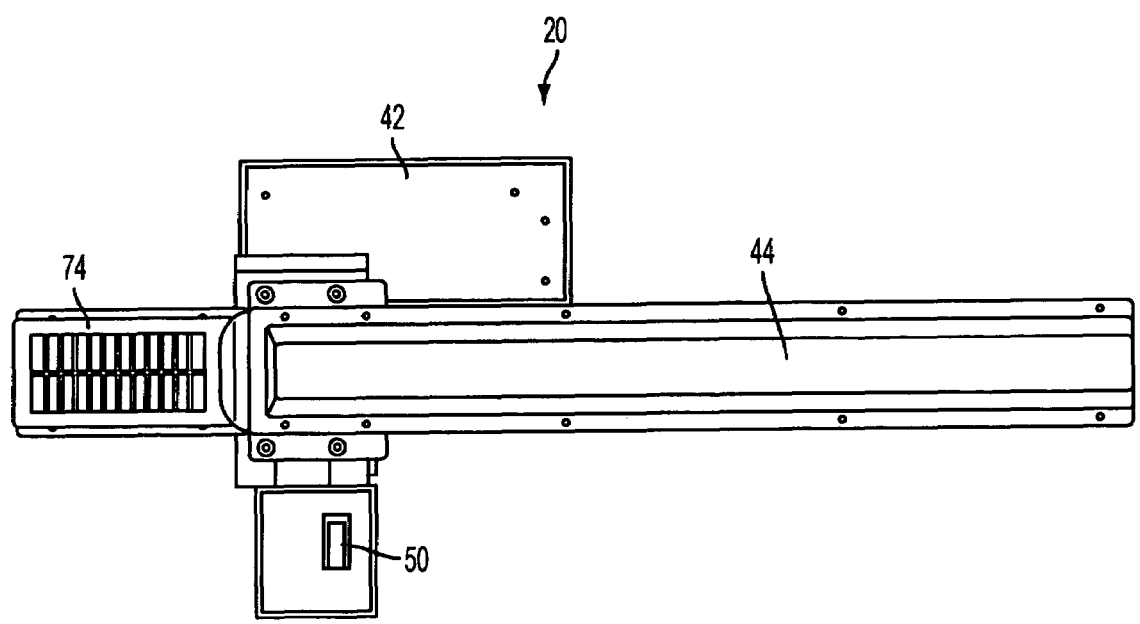
FIG. 2A is a front view of an embodiment of an onboard device.
Figure 2B:
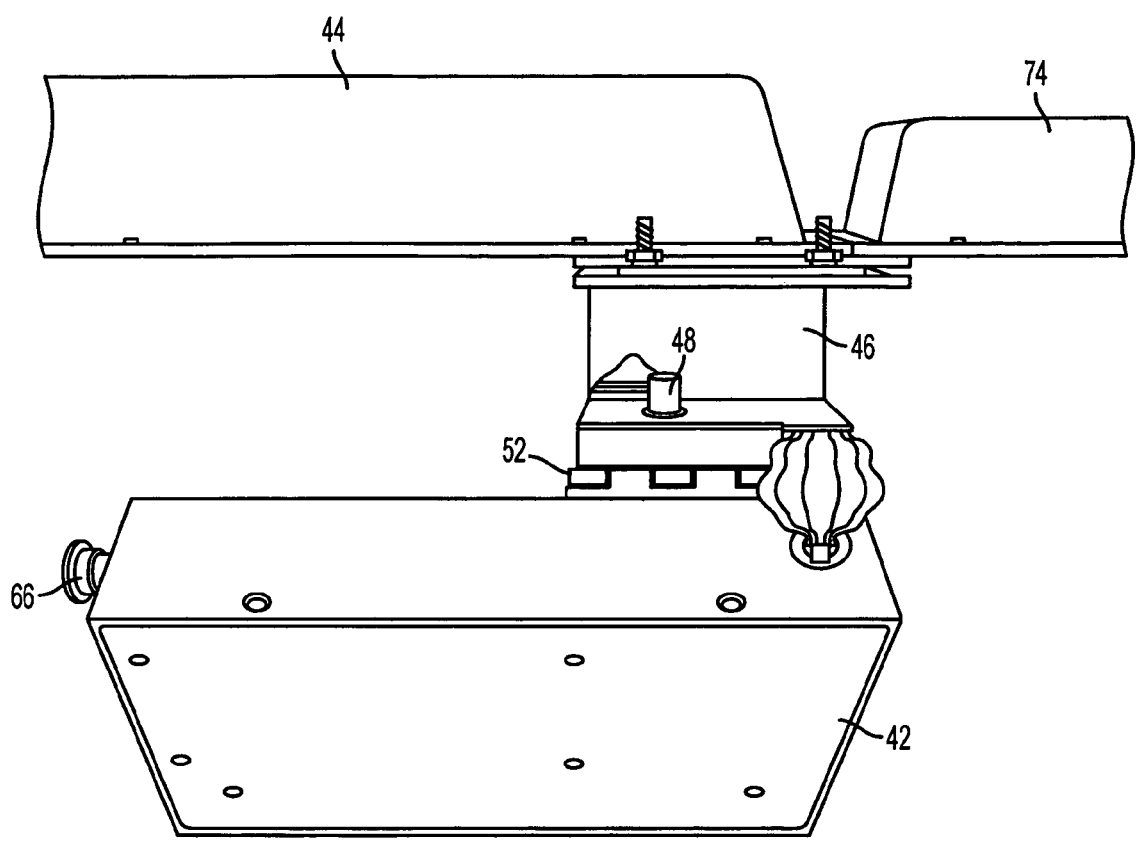
FIG. 2B is a side view of the onboard device of FIG. 2A showing the antenna unit, processor/sensor unit and bracket/clamp.

As illustrated in FIGS. 2A and 2B, the onboard device 20 includes a processor/sensor unit 42, antenna unit 44 and bracket/clamp 46. The device is assembled such that the components cannot easily be disassembled when the onboard device is affixed to a container. In the illustrated embodiment, the bracket/clamp 46 is shaped to allow it to be mounted to the left or right door of a container. The bracket/clamp 46 preferably includes two switches: a door mount switch 48 and a door close switch 50. The door mount switch 48 detects proper mounting of the bracket/clamp on the container door and transmit this information to a processor in the processor/sensor unit 42, which in turn will cause the device to enter into activated mode and initiate communication with a handheld device 34 (FIG. 1). The door close switch 50 senses that the container 22 is closed and transmits this information to the processor in the processor/sensor unit 42. This door-closed signal causes the onboard device to enter into an armed mode and communicate this information to the handheld device 34.

The processor/sensor unit 42 is attached to the bracket/clamp 46 via a hinge 52. The hinge 52 allows the processor/sensor unit 42 to swing back approximately 90 degrees, to facilitate mounting to a standard container door. As illustrated in FIG. 5B, the processor/sensor unit 42 is preferably shaped and sized to allow it to fit into the inside corrugation of a standard container door where it will be protected from damage and not take up cargo space within the container. When mounted, the processor/sensor unit 42 cannot be accessed from the exterior once the doors of the container 22 are closed.

Figure 3A:
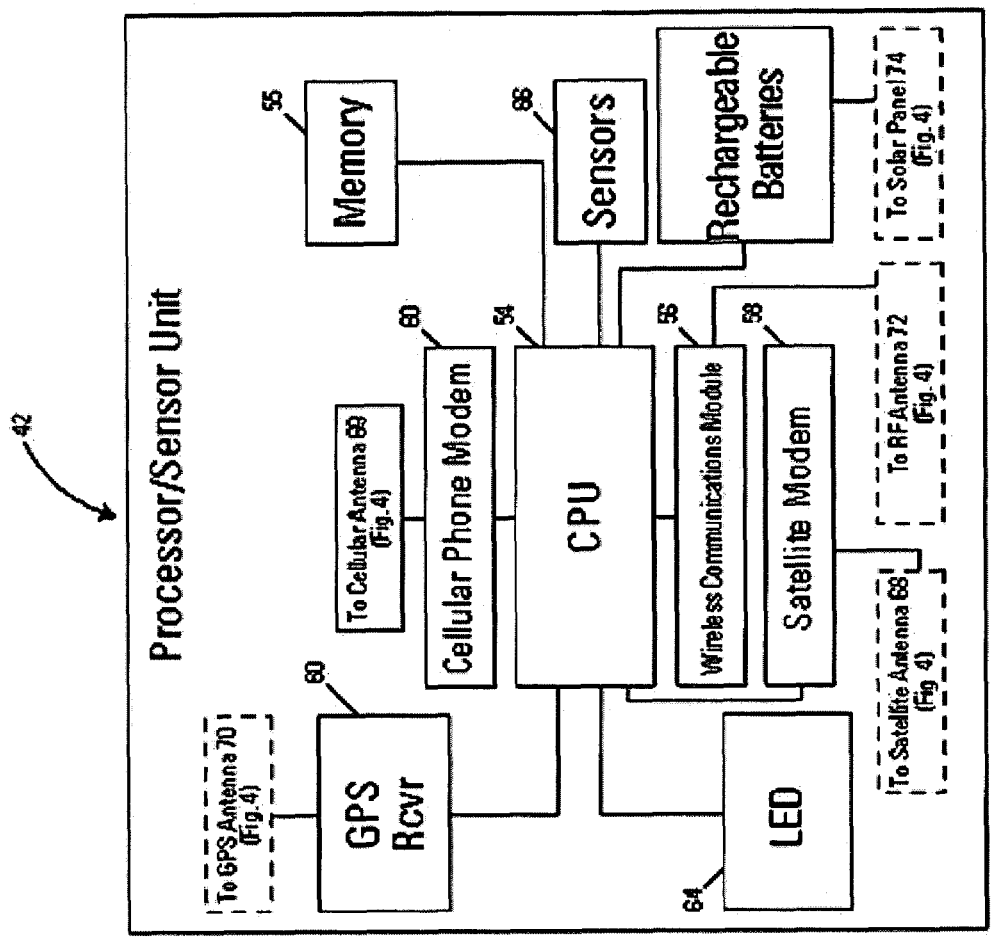
FIG. 3A is a block diagram of an embodiment of a processor/sensor unit of an onboard device.

As illustrated in FIG. 3A, the main components in the processor/sensor unit 42 are a central processing unit (CPU) 54, memory 55, a short-range wireless communications module 56, a satellite modem 58, a cellular phone modem 60, a global positioning system (GPS) receiver 62, a light emitting diode (LED) 64, sensors 66, and rechargeable batteries' 67. The processor/sensor unit 42 is preferably powered by rechargeable batteries. The processor/sensor unit 42 is controlled by a rule-based engine running in conjunction with an operating system.

Figure 3B:
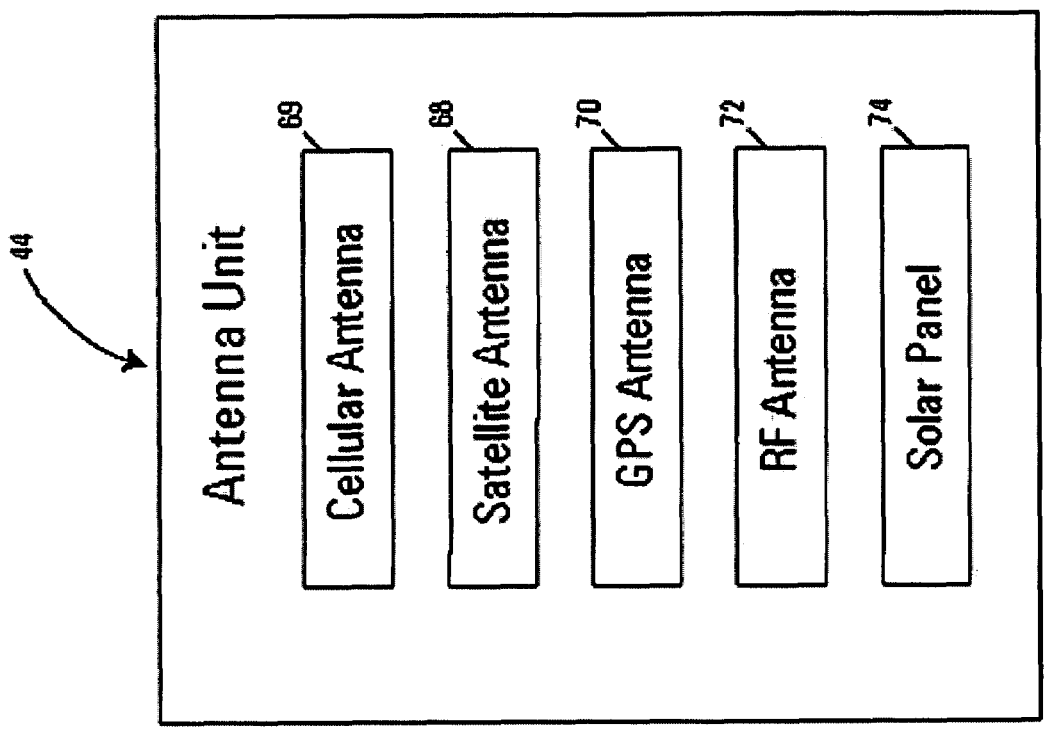
FIG. 3B is a block diagram of an embodiment of an antenna unit of an onboard device.

The short-range wireless communications module 56 permits short-range (e.g., less than 50 feet) radio communications with both fixed communications devices 30 and the handheld devices 34. The short-range wireless communications module is preferably a BLUETOOTH® adapter. The wireless communications module can have an internal antenna, but is preferably connected to an external short-range radio-frequency (RF) antenna 72 in the antenna unit 44 (FIG. 3B).

The satellite modem 58 permits bi-directional communications directly between the onboard device 20 and a satellite 26. The on-board device does not require a separate intermediary device to transmit and receive satellite communications. As discussed before the processor/sensor unit 42 is preferably programmed with various business rules designed to conserve power to conserve power necessary to permit satellite communications. In addition, the on board device preferably includes a solar panel 74 to recharge batteries. Thus, the onboard device overcomes the perceived problem of providing a power needed to transmit and receive satellite communications without using a stationary relay device affixed to the vehicle or vessel transporting the container. Sensors 66 can detect various door and container conditions, including door mounting, door opening/closing, light/infrared, temperature, humidity, and motion/vibration and can be expanded to include any other detectable conditions.

The business rules provide flexible and customizable programming of the onboard device to adapt to various routing, environment and transportation conditions. For example, the business rules can determine whether the device is within a hotspot such that it should communicate via a fixed communications device or whether satellite communications are the only option. Thus, by controlling the mode of communications, the business rules can improve the reliability of communications and conserve power required for communications. The business rules can also be used to reduce false alarms. For example, a sensor reading indicating small bursts of light might be disregarded if the processor determines (based upon the GPS reading and/or pre-planned routing guide) that the container is being transported along a bumpy road. In addition, the business rules can be changed while the container/onboard device is in transit. For example, such a change may be desirable where the there are changes to the pre-planned routing of the container.

The GPS receiver 62 can capture GPS location from satellites and store the longitude and latitude in memory. The frequency of GPS location capture is based on programmed business rules that factor in the supply-chain segment, motion, and other conditions. As described below with the description of FIGS. 9A-9J, graphic activity-map screen display generated by a program on the central computer system 24 allows easy tracking and review of each container's position during transit from origin to destination. The tracking logs captured for each container's transit from origin to destination contain an audit trail of events, with time-stamps, GPS locations, and event types. The logs also monitor battery-power on the onboard device, and sent alerts when battery power becomes low. Container transit data is available for review online via inquiry screens generated by a program on the central computer system 24.

The onboard device 20 can be programmed to periodically "call home" to track the container's location. The frequency at which the device calls home can be varied depending upon the location of the device and the relative safety of the area in which the container is located. The frequency can be altered by communication from the central computer 24. In addition, the central computer 24 can interrogate the onboard device 20 via satellite to determine the device's position at any given moment.

Antenna unit 44 is attached to bracket/clamp 46 by screws or other means of attachment. As illustrated in FIG. 3B, the antenna unit 44 houses a satellite antenna 68, cellular antenna 69, GPS antenna 70, a short-range RF antenna 72 and a solar panel 74. The solar panel 74 is positioned on the external portion of the antenna unit 44 to capture sunlight to recharge the batteries 67 in the processor/sensor unit 42 (FIG. 3A).

Figure 4:
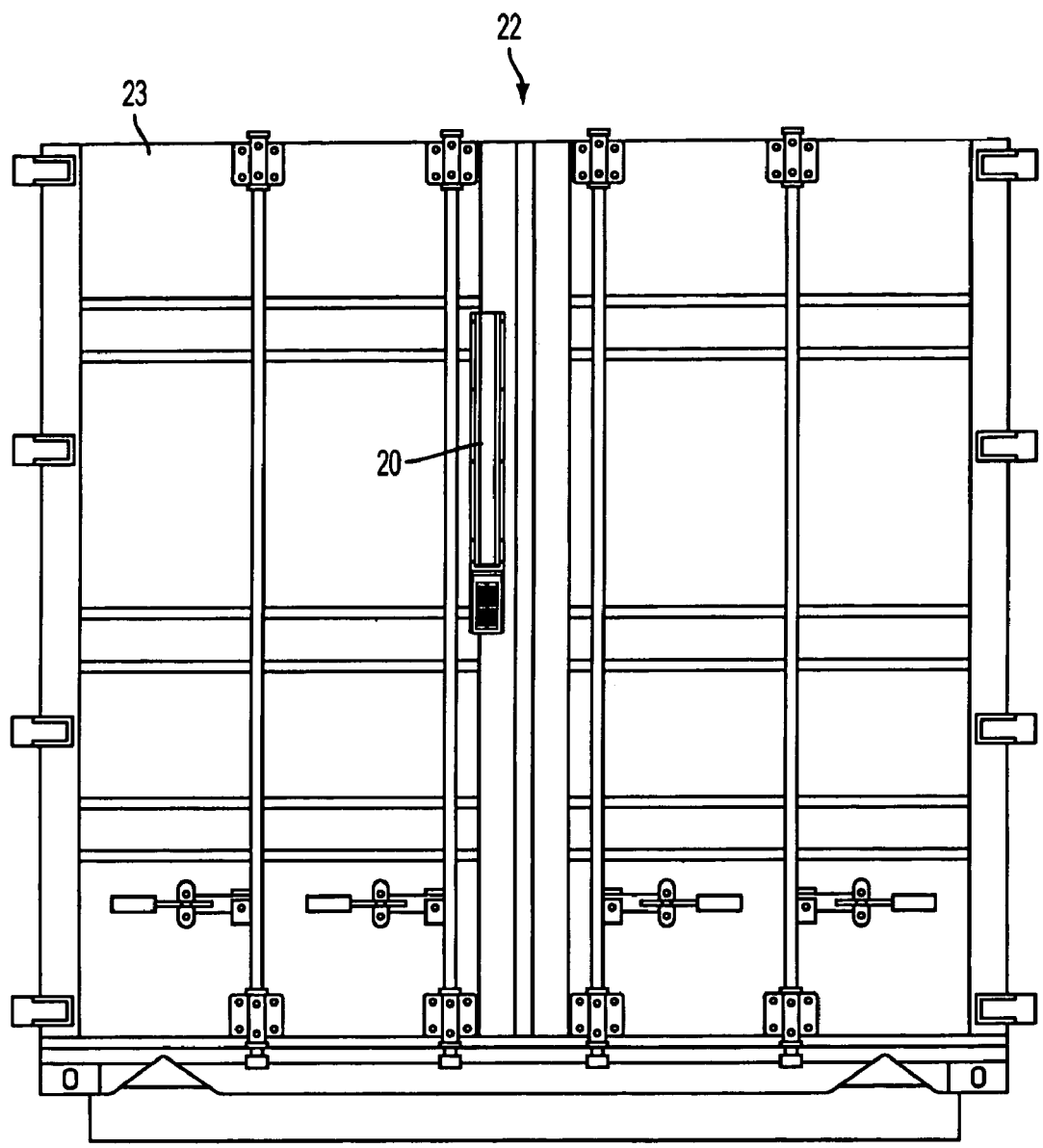
FIG. 4 is an exterior view of is an exterior view of an embodiment of an onboard device installed on a container door.
Figure 5A:
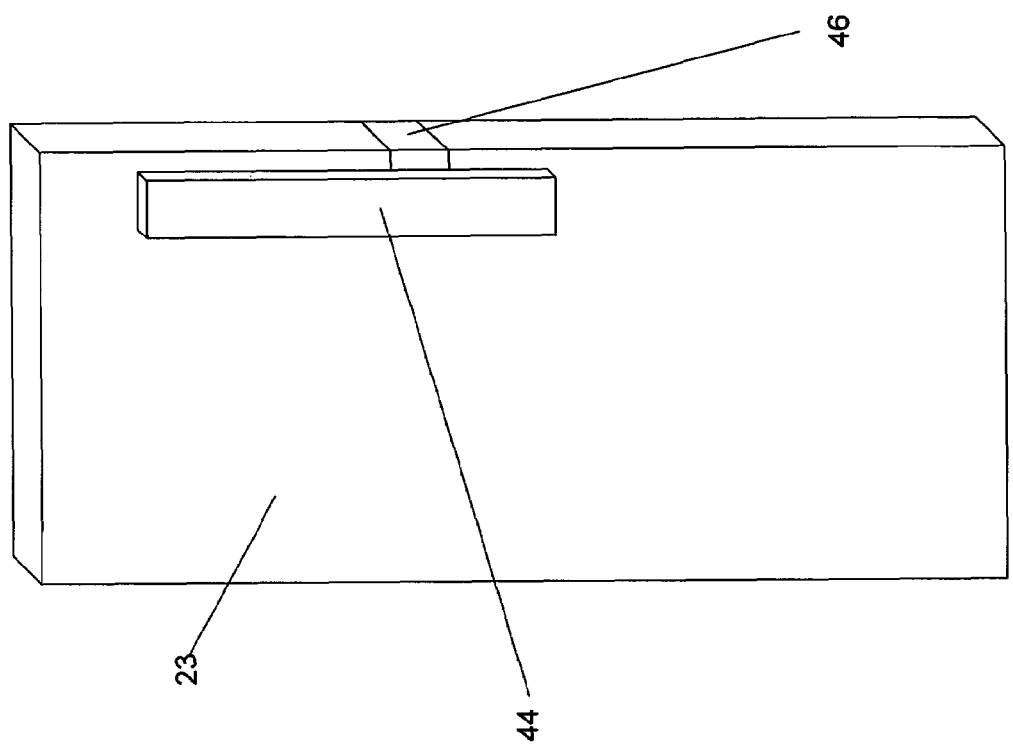
FIG. 5A is a diagram showing the installation of an embodiment of an onboard device on the exterior of a container door.
Figure 5B:
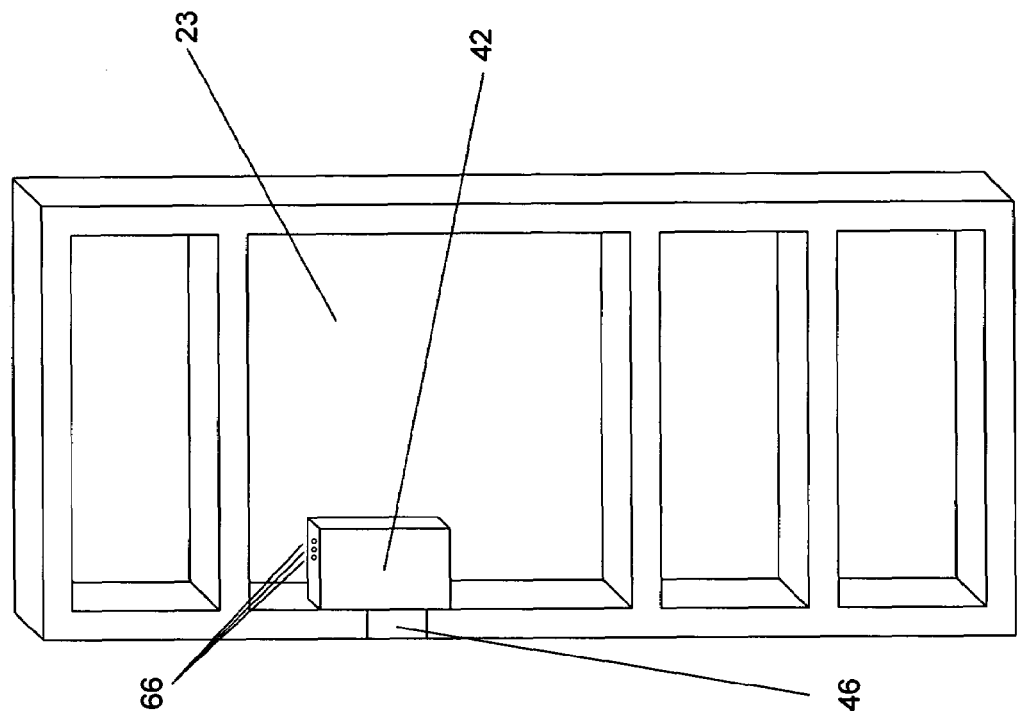
FIG. 5B is a diagram showing the installation of an embodiment of an onboard device on the interior of a container door.

FIGS. 4 and 5A illustrate the exterior location of the onboard device 20 when mounted on a door 23 of the container 22. Only the antenna unit 44 and part of the bracket/clamp 46 that wraps around the door 23 is visible and accessible from the exterior of the container. FIG. 5B illustrates the interior location of the onboard device 20 when mounted on a door 23. The processor/sensor unit 42 fits into the inside corrugation of the door 23 of the container 22 where it will not take up any cargo space and is protected from damage. The bracket/clamp 46 wraps around the door 23 to secure the onboard device to the container.

Handheld Device

One or more handheld devices 34 (such as a personal digital assistance (PDA)) communicate with the onboard device 20, preferably using BLUETOOTH® technology. Handheld device 34 can be a commercially available PDA/RFID reader programmed to perform the functions described herein. Examples of such commercially available devices include the IPAQ 4355 and LXE MX5, operating with Windows CE and containing BLUETOOTH® signal processors. The handheld device 20 is used to initialize, enable, and update the onboard device 20 during the container loading ("stuffing") process. The handheld device can be cradled into a docking station which uploads data to the central system 24 or data can be transmitted to the central computer by other wired or wireless means.

The handheld device 34 can be used to set the onboard device 20 to various states required to support the system. In addition, information about the cargo 36 transported in the container 22 can be captured using the handheld device 34. Cargo information can be captured by reading a computer-readable tag 37 (e.g., a bar code or radio frequency identification (RFID) tag) on the cargo 36 which stores cargo information. Cargo information captured by the handheld device 34 can be transmitted to the onboard device 20 or to central computer 24. Cargo information captured by the handheld device 34 (or derived from captured information) can include, for example, manifest, bill of lading, purchase order, shipping order, commercial invoice information, packing list, and/or forwarder's cargo receipt (FCR). The handheld device 34 and the onboard device 20 preferably communicate using BLUETOOTH® technology. The handheld device 34 can communicate with the central computer 24 through a cradle connected to a workstation 38 via network 32. The handheld device 34 can also receive software updates (e.g., business rules) from the central computer system 24 and communicate the updates to the onboard device 20.

The security setup can be configured so a handheld device is designated for a specific location (geofenced area). This setup provides a level of security by prohibiting a device from being used in a different location (e.g., if the device is stolen).

Fixed Communications Device

One or more fixed communications devices 30 are positioned at designated areas to facilitate cellular communications. For example, fixed communications devices can be mounted on poles near the gates of facilities such as consolidation locations, terminals, and deconsolidation locations. Each fixed communications device 30 creates a hotspot to facilitate cellular communications between the onboard device 20 and the central computer system 24 when the container is in or near the facility. Fixed communications devices 30 can be used as a backup communications mechanism, in the event of satellite failure or where cellular communications are more reliable, faster or less expensive than satellite communications.

Figure 6:
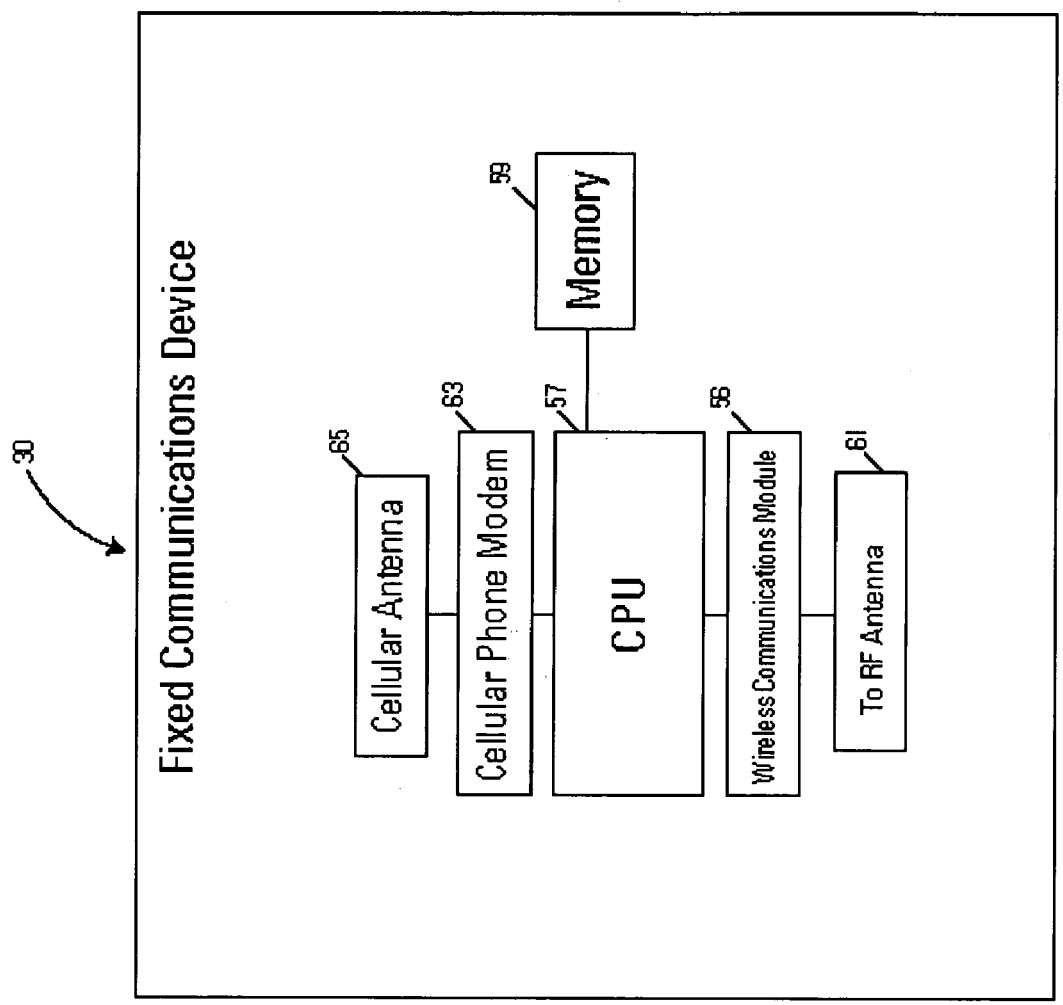
FIG. 6 is a block diagram of an embodiment of a fixed communications device.

The components of the fixed communications device 30 are essentially the same as are in the onboard device, with the exception that the fixed device is not equipped with a satellite modem or sensors. With reference to FIG. 6, the main components of the fixed communications device 30 are a central processing unit (CPU) 57, memory 59, a short-range wireless communications module 56 connected to an RF antenna 61, and a cellular phone modem 63 connected to a cellular antenna 65. Short-range wireless communications module 56 and RF antenna 61 communicate with the onboard device 20, preferably using BLUETOOTH® technology. The fixed communications device in turn communicates with the central computer system 24 via computer network 32 (FIG. 1) using cellular phone modem 63 and cellular antenna 65. The fixed communications device can also include other alternative modes of wired and wireless communications, for example, a satellite modem and antenna or wired telephone or network connection.

In areas where satellite communications are not optimal (e.g., inside a warehouse or factory), fixed communications devices 30 can be installed as connection point for the onboard device 20. The use of fixed communications devices 30 provides a separate means of communication between the onboard device 20 and the central computer system 24 as a backup to satellite communications. Transmissions between onboard device 20 and fixed communications device 30 are communicated by short-range wireless communications, preferably using BLUETOOTH® technology. Fixed communication device 30 preferably communicates with the central computer-system 24 via a cellular telephone connection to network 32. The fixed communications device 30 can also be configured to serve as primary point of communication to limit satellite communications to reduce satellite communication costs. Business rules controlling the onboard device 20 can be configured to communicate according to a hierarchy where satellite communications are avoided for routine, non-alert communications when the device is capable of communicating via a fixed communications device 30. The onboard device 20 is also equipped with a cellular phone modem 60 (FIG. 3A) for allowing it to connect directly to the nearest cellular phone tower 28 that allows the device to communicate with a central computer system 24 via a computer network 32. The use of the various communication methods is determined by the business rules.

Central Computer System

The system also includes one or more workstations 40 to allow authorized users to access information stored on the central computer 24 via network 32. The central computer 24 can also be configured to forward events and alerts transmitted from an onboard device 34 to selected e-mail accounts, facsimile machines, mobile pagers, electronic data feeds into information technology (IT) systems, and mobile phones as text messages. The central computer system 24 is preferably a secure, web-based system for storing operational data from all sources. It collects data from the handheld device 34, fixed communications device 30 and onboard device 20, and also has the capacity for data entry and update. Also, as illustrated in FIGS. 9A-9J described below, the system includes on-screen maps for visual display of certain aspects of the data. It provides menu-driven screens for inquiry of container monitoring data, administrative functions, and map-viewing.

Both the central computer system 24 and the handheld device 34 preferably require a successful login before allowing access. The system can use standard https security processes, with challenge/response prompting for user-login details. User ID's are controlled on the central computer system 24.

System Operation

Operation of the monitoring and tracking system of the present invention is described below with reference again to FIG. 1.

Before loading of the container 22 an onboard device 20 is mounted on the left or right door 23 of the container 22. Mounting of the onboard device 20 triggers door mount switch 50 FIG. 2B), which automatically activates the onboard device 20 and causes it to initiate communication between with handheld device 34. A unique number of the container 22 is entered into the handheld device 2 creating a logical relationship between the onboard device 20 and the container 22.

A unique shipping order and/or purchase order identifier for the goods to be loaded into the container 22 is stored on the handheld device 34. The shipping order/purchase order identifier originates from the central computer system where cargo booked by the client is uniquely identified. Pre-planned routing guides for shipping of the goods are also stored to the handheld device 34. The pre-planned routing data can include information relating to planned shipping routes, planned modes of transportation, expected duration of each leg of the journey, and other routing information. This data can be uploaded when the handheld device 34 is in communication with the central computer system 24.

Connection from the handheld device 34 to the central computer system 24 can be restricted by an access control module in the central computer system 24, which ensures that only authorized access is permitted. The handheld device 34 can be cradled and connected to the central computer system 24 daily to ensure it remains active and authorized. A unique key can be transmitted from the central computer system 24 to the handheld device 34 on a daily basis. If a handheld device 34 does not receive the daily key, communication with the onboard device 20 will be rejected by the onboard device 20 if the handheld device's key is not the same as the onboard device's key. Daily transmission of a key protects against misuse of a stolen handheld device. Daily keys for a predetermined period (e.g., 180 days) can be stored in the onboard device 20 upon deployment. If an onboard device 20 is to remain in active service beyond the predetermined period for which daily keys have been stored, daily keys to extend this period can be communicated to the onboard device 20 from the central computer 24 via the handheld device 34.

When loading of the container 22 is about to commence, one or more unique shipping order and/or purchase order numbers are selected on the handheld device 34 creating a logical relationship between the order placed by a customer and the goods that is physically loaded into the container 22.

If a unit of goods 36 (carton, coli, pallet or box) is equipped with computer-readable identification tag 37 (e.g., a radio frequency identification (RFID) tag or bar code), the tag is scanned to automatically build a manifest using the handheld device 34. Where a unit of goods 36 is not equipped with an identification tag, a manual count can be entered into the handheld device 34 to create the manifest.

When loading of the container 22 is completed, a manifest of loaded goods, bill of lading, purchase order, shipping order, commercial invoice information, packing list, forwarder's cargo receipt (FCR) and a pre-planned routing guide for shipping the container 22 are communicated from the handheld device 34 to the onboard device 20 after which the doors 23 of the container 22 are closed.

The sequence of communications between the onboard device 20 and handheld device 34 is preferably as follows:
1. "Close door" command is selected in the handheld device 34, initiating the transmission of a command to the onboard device 20;
2. The onboard device 20 receives this command and activate the sensors that take a reading of the environment to ensure that the sensors can detect difference (e.g. in light level when the doors are closed);
3. The onboard device 20 sends a "please close the doors" message to the handheld device 34 to ask the operator to close the doors;
4. The doors are closed by the operator;
5. The onboard device 20 recognizes the door closing and, if all is okay, a "doors closed successfully" message is sent to handheld device 34.

The container is now closed and the sensors are armed; any unauthorized opening of the container will result in an intrusion alert.

By activation of door close switch 50 (FIG. 2B) and/or other built-in sensors (e.g., light detecting sensors), the onboard device 20 detects that the doors of the container are closed and enters into an "armed" state. All sensors are alert to container conditions, such as appearance of light, change in humidity, change in temperature and vibration. The onboard device 20 transmits an alert via satellite 26 and/or phone connection 28 if a sensor input exceeds predefined thresholds or if the container position deviates from a pre-planned routing guide by predetermined thresholds (e.g. geographic position, duration of transport between locations or vibration in part of the routing where vibration is not expected).

If the container 22 is sealed using a mechanical seal, the unique identification number of the seal can be entered into the handheld device 34 and communicated to the onboard device 20. The operator then disconnects communication between the handheld device 34 and onboard device 20 by selecting a disconnect command on the handheld device. The container 22 is then ready for departure and any intrusion into the container 22 from this point and until it is opened by means of an authorized procedure will trigger and alarm.

Figure 7:
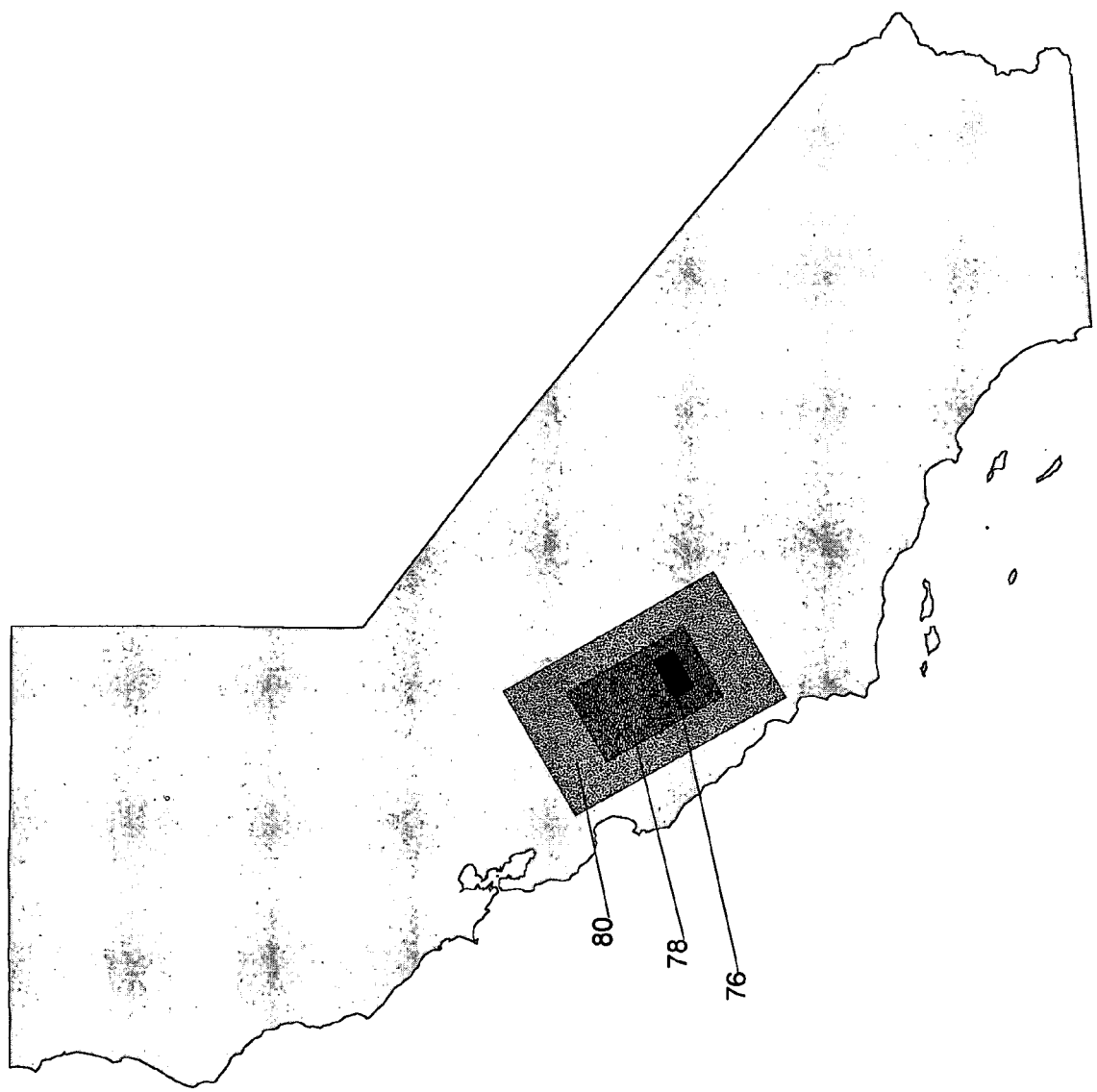
FIG. 7 is a diagram illustrating geographical areas defined and used by the system in accordance with an embodiment of the invention.

FIG. 7 illustrates the location of a secure facility 76 (e.g., a warehouse or a factory), a geofenced area 78 surrounding the secure facility and a surrounding approach area 80. These locations can be created using a standard GPS locator device. The coordinates outlining each area are uniquely defined and stored for use in the business rules controlling the onboard device 20. Each area is defined with its own unique set of rules and security parameters. These rules and parameters determine how the onboard device will react when in the area (e.g., higher or lower level of alertness depending on how secure the area is). The geofenced area is the immediate surrounding area of a secure facility. The approach area is a defined perimeter surrounding a geofenced area. The approach area generally is assigned a lower level of security than the geofenced area, but still higher than the surrounding unsecured area.

Upon departing a secure facility 76, the GPS receiver 62 (FIG. 3A) of the onboard device 20 will obtain GPS readings to determine the position of the container. The CPU 54 will then establish an exact location in relation to the geofenced area 78 and the approach area 80 surrounding the secure facility 76. As the container passes through each of these areas, the onboard device 20 increases its degree of alertness. Similarly, the onboard device 20 will lower its level of alertness when entering into an approach area 80, a geofenced area 78 and a secure facility 76. The cargo is subject to the highest level of risk in terms of intrusion, hijacking, theft, etc., during transit between secure and controlled facilities. When the container/onboard device departs from a secure facility and its perimeter, the onboard device is preferably programmed to become more and more alert. The reverse will happen when entering into a secure facility and its perimeter. When a container/onboard device enters an approach area, the device can also transmit an "early warning" of arriving goods and can start preparing for the receipt and work required in this connection.

Geofenced areas 78 can furthermore be configured so the business rules on the onboard device 20 will cause the device to enter into a state of hibernation to conserve energy if, based upon the pre-planned routing guide for the shipping of the container 22, the CPU 54 determines that the container 22 is to reside in a geofenced area 78 for a long period of time (e.g., when stored in a container yard of a port waiting to get loaded onto a vessel).

During transport of the container 22 outside geofenced areas 78 or approach areas 80, the onboard device 20 makes frequent GPS readings to create a detailed log of its locations. The log is transmitted to the central computer system 24.

Alerts are likewise transmitted to the central computer system 24 via satellite 26. If a fixed communications device 30 is within reach, alerts will also be communicated though the fixed communications device as a backup or alternative means of communication. Alerts can be set up to be forwarded to e-mail accounts, telefaxes, mobile pagers, electronic data feeds into IT systems, and mobile phones 25 as text messages. This ensures short time between an alert being created and attention drawn to the container (e.g., to ensure that further transport of the container is ceased and it is inspected for intrusion).

When the container 22 arrives at its destination, the onboard device 20 will detect an approach area 80, a geofenced area 78 and a secure facility 76. The transition into areas where the security is increasingly higher will cause the sensors 66 to automatically re-calibrate according to the changes in environment. The onboard device 20 will communicate with any fixed communications devices 30 installed in the destination area and transmit events to the central computer system 24.

When the container 22 is to be opened and the cargo unloaded (stripped), connection between the onboard device 20 and a handheld device 34 designated for the destination is established. The manifest is transferred from the onboard device 20 to the handheld device 34 for use during the unloading (stripping). The container number and seal identification number are also populated to the handheld device 34 to allow for control.

Upon confirmation of theses details, an open command is issued via the handheld device 34 to the onboard device 20, which changes the business rules in the processor/sensor unit 42 that disarms the sensors 66. Opening of the doors of the container 22 is now considered an authorized event.

During stripping of the container 22 all units of goods 36 equipped with a computer readable tag 37 are scanned using the handheld device 34 for automated deconsolidation against the manifest. Where a unit of goods 36 is not equipped with a tag 37 a manual count is entered into the handheld device 34 for deconsolidation against the manifest.

If the container 22 has not reached its final destination (e.g. upon arrival at a cross-docking facility) loading of units of goods 36 can be loaded and the container 22 sealed for further transport as described above.

When the container 22 has arrived at its final destination, all units of goods 36 are stripped, a dismount command is transmitted to the onboard device 20 using the handheld device 34, and the onboard device 20 is physically dismounted from the container 22. The onboard device 20 is reusable and can be recycled for use at a new origin.

Authorized users will, throughout the process, have online access to the information stored in the central computer system 24 from workstations 40 connected through the computer network 32. All access is preferably established through secure connections.

The data captured by the onboard device provides the commercial audience with full tracking capabilities on their assets within a container, allowing verification, earlier planning and monitoring from the point of consolidation to the point of deconsolidation. This adds tremendous value to the importer's productivity and reliability by enabling efficient stock controls and replenishment planning for reduction in costs of holding stock both at the factories and distribution centers. As a result, costs can be more predictable and controlled, with fewer variables.

The information captured by the system also provides an audit trail of security, which when shared with customs agencies, customers, port operators and others, could effectively accelerate the flow of cargo by lowering container risk profiles. In other words, knowing with a high degree of certainty that cargo is secure can enable special truck gates at terminals, green lanes with customs, bypass of Vehicle and Cargo Inspection Systems (VACIS), bypass of customs examination station, saving movement costs, centralized exam site labor costs and providing overall priority handling on the import side. Each of these can lead to accelerated transits and speed to market.

Communication Flow

Figure 8:
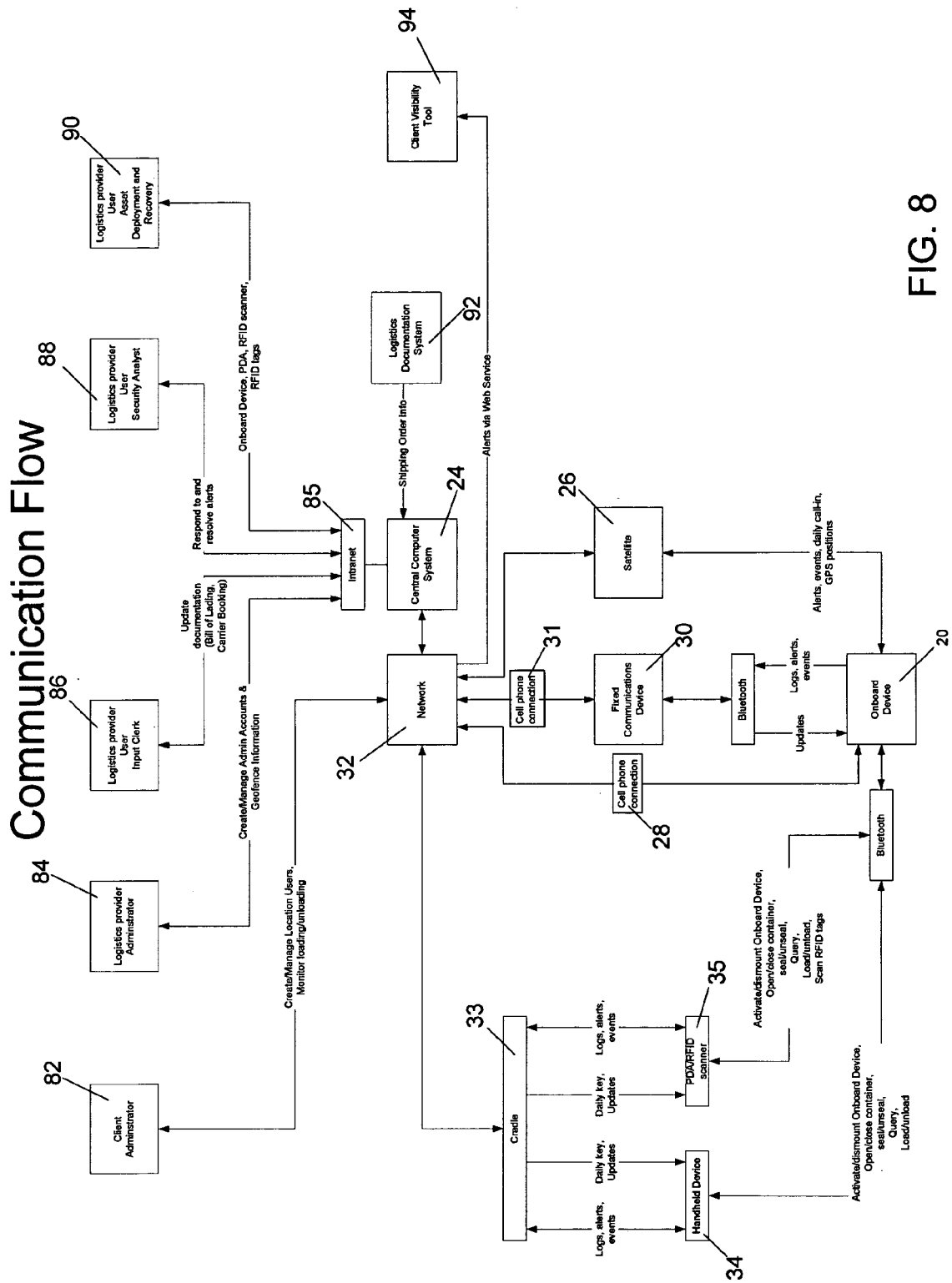
FIG. 8 is a block diagram showing an example of communication flow between the components of a shipping container monitoring and tracking system in accordance with an embodiment of the invention.

FIG. 8 is a diagram illustrating communication between the users and components of a container tracking system in accordance with the principles of the invention.

As discussed above, communications between onboard device 20 and handheld device 34 are preferably made using BLUETOOTH® technology. Activate/dismount, open/close container, seal/unseal, queries, and load/unload signals and data are transmitted between the onboard device 20 and handheld device 34. A scanner 35 for reading tags (e.g., bar code or RFID tags) also communicates the onboard device 20, preferably via BLUETOOTH® technology. Scanner 35 may be incorporated within handheld device 34 or may be a separate device. Handheld device 34 and scanner 35 both communicate with the central computer 24 via cradle 33 attached to network 32, which can be, for example, the Internet.

Onboard device 20 also communicates with central computer system 24 via fixed communications device 30, satellite 26 or cellular telephone connection 28. Communications between onboard device 20 and fixed communications device 30 are preferably transmitted using BLUETOOTH® technology. Onboard device 20 transmits logs, alerts and events to central computer 24, and receives software updates from central computer 24 via fixed communications device 30. Communications between fixed communications device 30 and central computer system 24 are preferably made via network 32 and cell phone connection 31. Communications between the onboard device 20 and the satellite 26 are bidirectional. Alerts, events, daily call-ins, and GPS position data is transmitted from the onboard device 20 to the central computer system 24 via satellite 26 and network 32. The central computer system 24 can also transmit commands, data or program updates to the onboard device 20 via satellite 26 and network 32. For example, the central computer 24 can interrogate the onboard device 20 for its current position at any point during transit.

Various administrators and systems communicate with central computer system 24. Client administrator 82 can communicate with central computer system 24 via network 32 to create and manage users and monitor loading and unloading functions. Logistics provider administrator 84 communicates with central computer system 24 via intranet 85 to create and manage administrative accounts and geofence information. Logistics provider user input clerk 86 communicates with central computer system 24 via intranet 85 to update documentation, such as, bill of lading and carrier booking information. Logistics provider user security analyst 88 communicates with central computer system 24 via intranet 85 to receive and resolve to security alerts. Logistics provider user asset deployment recovery 90 communicates with central computer system 24 via intranet 85 to transmit data relating to the onboard device, handheld device, scanner, and tags. Shipping order information is directly transmitted to central computer system 24 via logistics documentation system 92. Client visibility tool 94 communicates with central computer system 24 via network 32 to allow clients to access selected data and documents relating to the tracking of their shipments.

Central Computer System User Interface

The central computer system 24 preferably provides a menu driven user interface for inquiry of container journey data via several input criteria. Users can inquire by container number or see a general on-screen listing of alerts. Authorized users can see where and when alerts occurred and input resolution details for alerts. FIGS. 9A-9J provide examples of various user displays for monitoring and tracking cargo using the system.

Figure 9A:
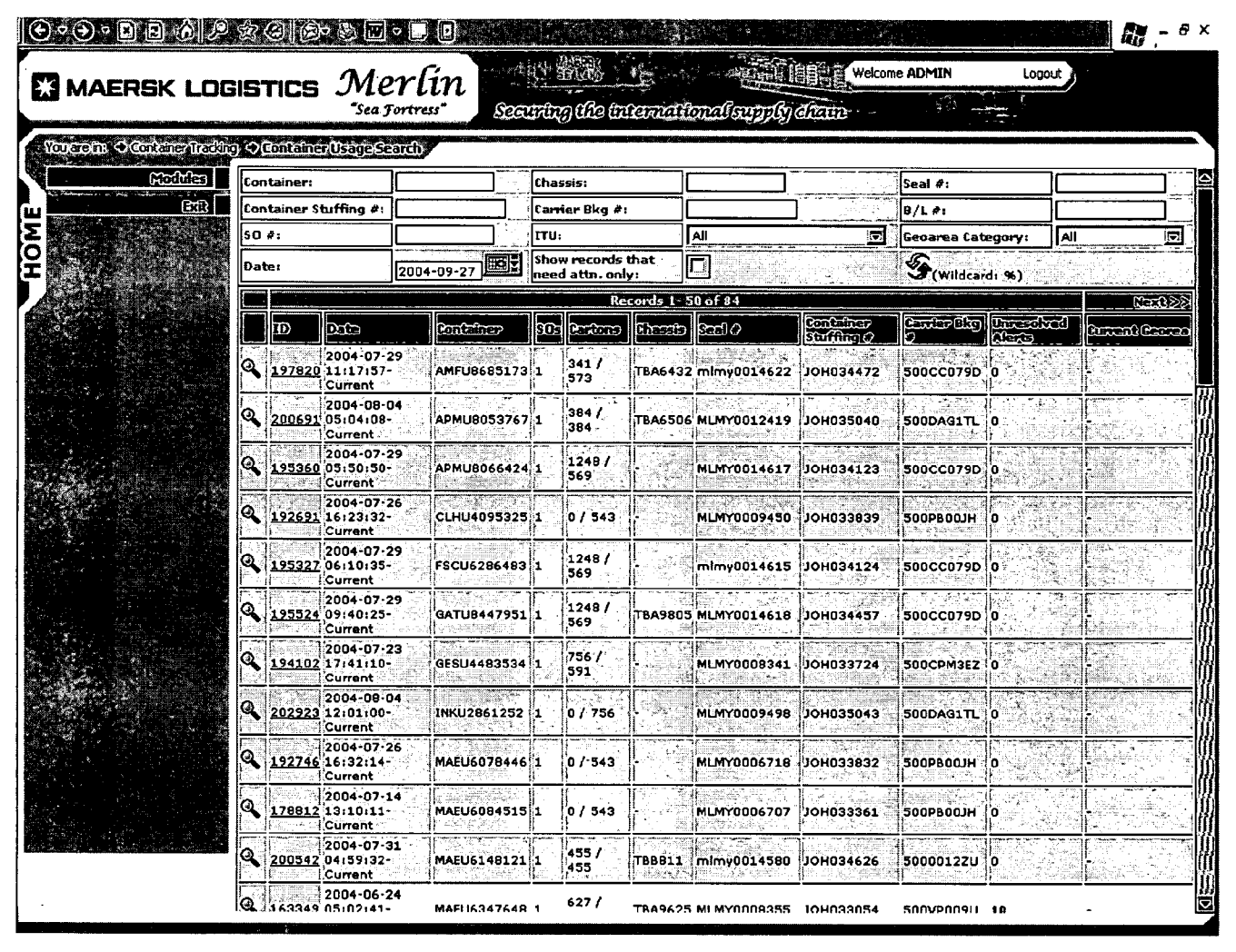

FIG. 9A shows a graphical user display listing containers that are tracked using an onboard device. Containers appear in this list when they are deployed and equipped with an onboard device. The display lists a range of information relevant to the business process supported by the tracking of the containers (e.g., number of units of goods in the container, the chassis used to haul the container, and the seal applied to the container). The list can be filtered to display containers according to chosen selection criteria as well as sorted to list the presented containers in a specific order.

Figure 9B:
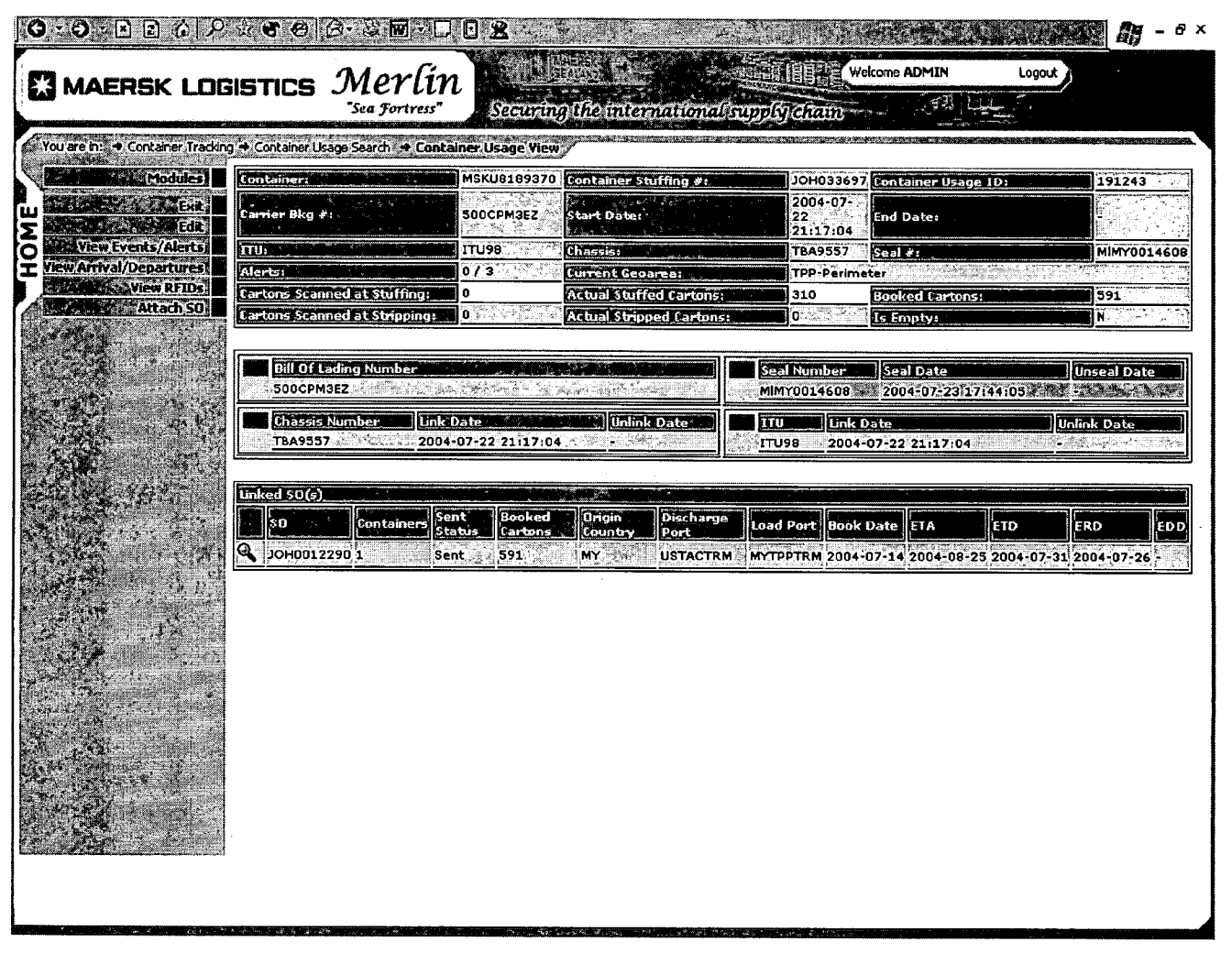

FIG. 9B shows a graphical user display listing details for a particular container, selected from the listing shown in FIG. 9A. All relevant details relating to the shipping of the container are displayed (e.g. bill of lading number, shipping order number, planned and actual stuffed volumes) and audit trails where essential tracking components have been changed for the selected container (e.g., onboard device number, chassis number, seal number, bill of lading number).

Figure 9C:
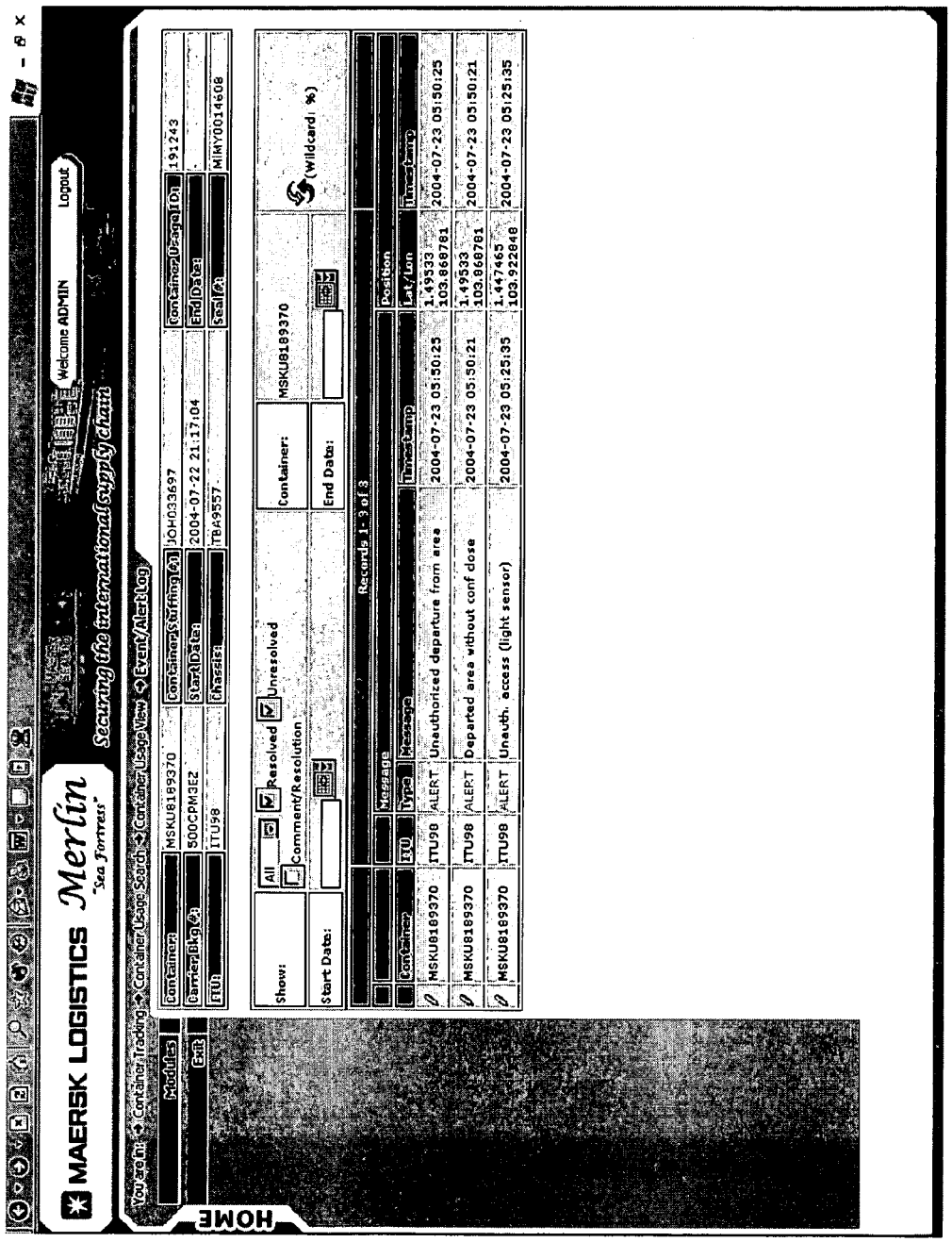
FIG. 9C is an example of a graphical user interface for displaying container alerts for a container be tracked in accordance with an embodiment of the invention.

FIG. 9C shows a graphical user display listing events and alerts for a particular container selected from the listing shown in FIG. 9B. The events and alerts are listed with date, time and location of occurrence and date and time of receipt in the central computer system. The list can be filtered to contain events and alerts according to chosen selection criteria, as well as sorted to list the presented events and alerts in a specific order.

Figure 9D:
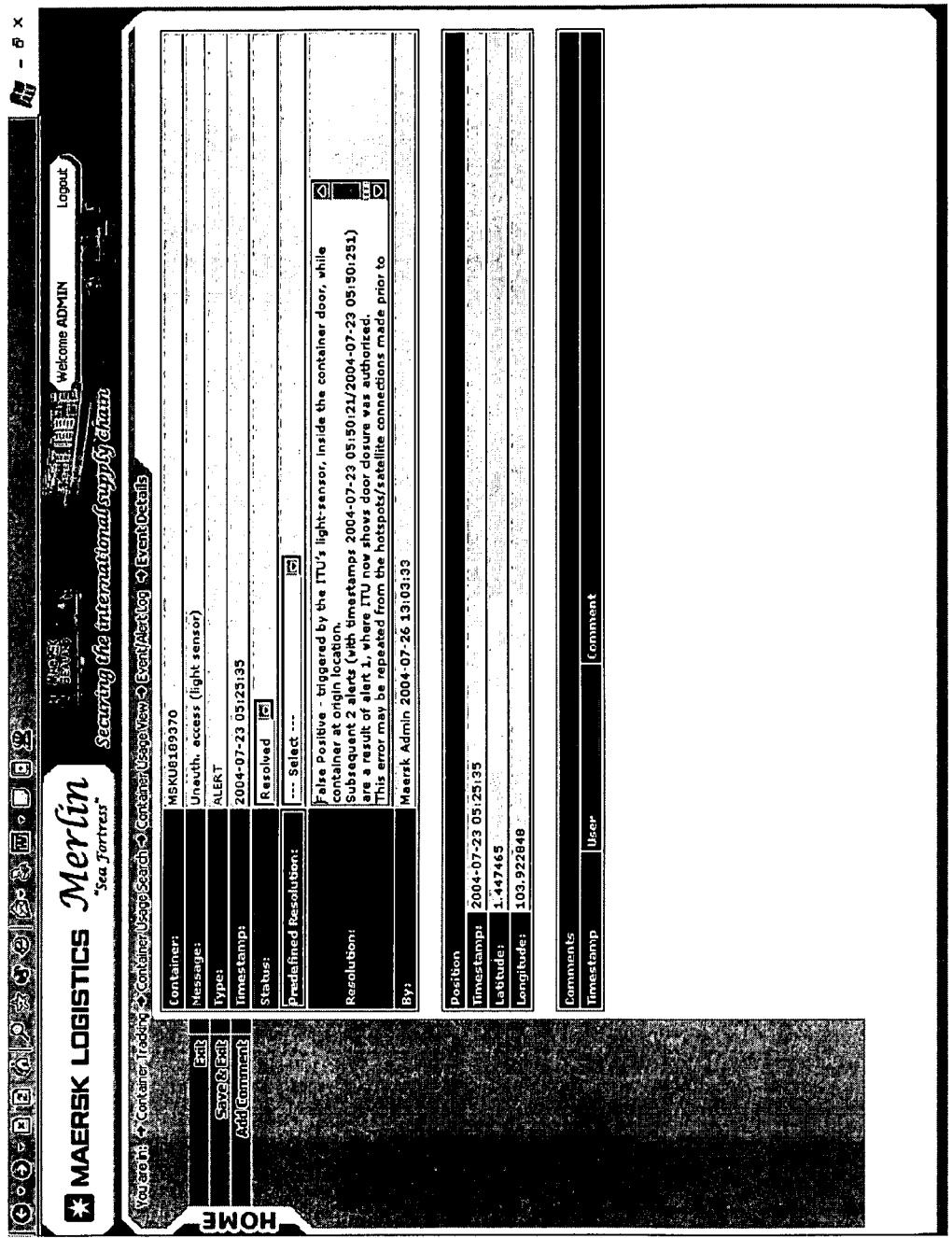
FIG. 9D is an example of a graphical user interface for displaying details of container alerts for a container being tracked in accordance with an embodiment of the invention.

FIG. 9D shows a graphical user display listing details for a particular event or alert, selected from the listing shown in FIG. 9C. Details relating to the even or alert are displayed (e.g. type of event or alert, date and time of occurrence, location of occurrence, date and time of receipt the central computer system, status, resolution).

Figure 9E:
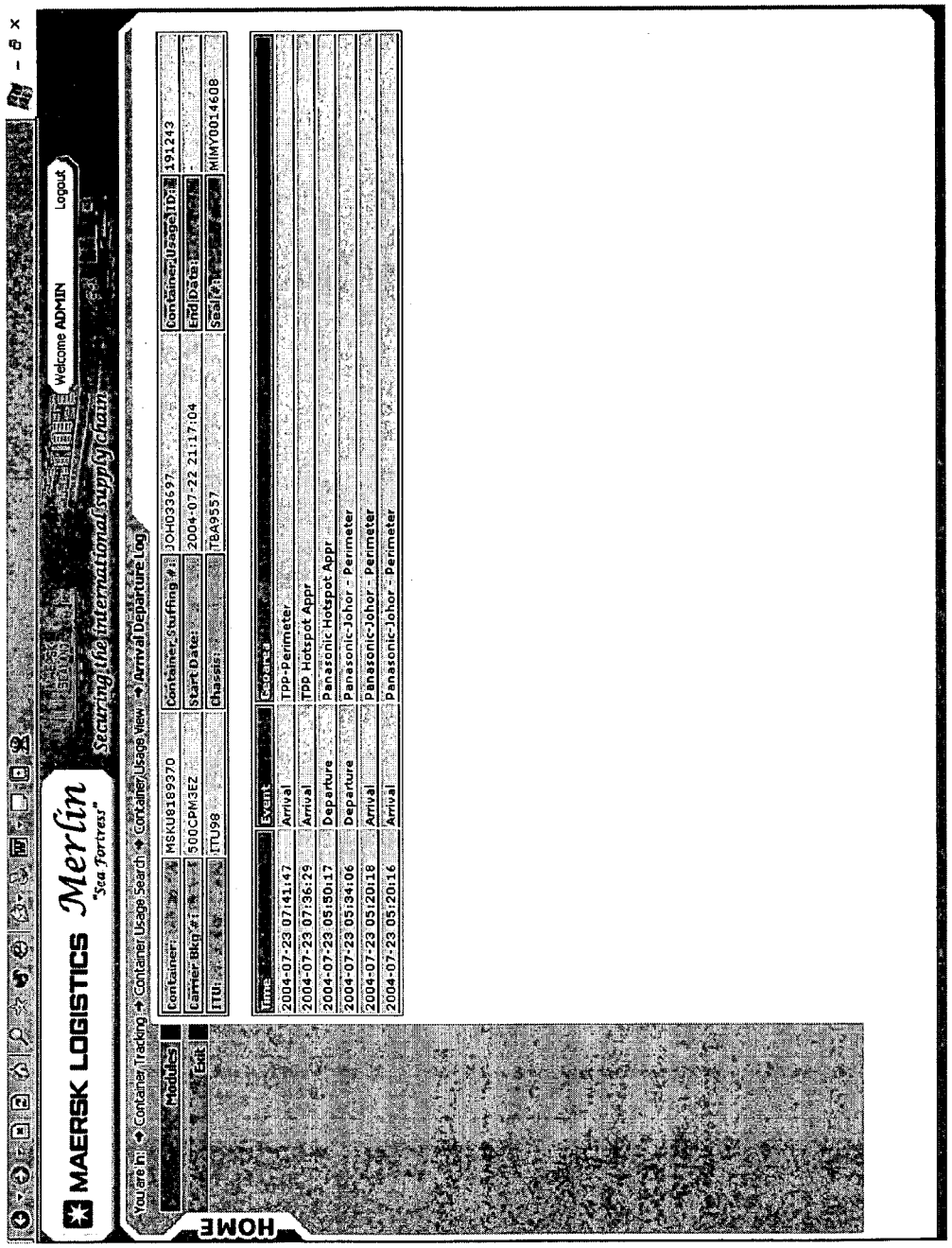
FIG. 9E is an example of a graphical user interface for displaying an arrival/departure log for a container tracked in accordance with an embodiment of the invention.

FIG. 9E shows a graphical user display listing arrival and departure log for a particular container selected from the listing shown in FIG. 9A. The listing will show all entry into and departures from areas defined as a secure facility, geofenced area or approach area. The listing defines the custody of the container as an audit trail illustrating where the container was at a certain date and time during the transit from origin to destination.

Figure 9F:
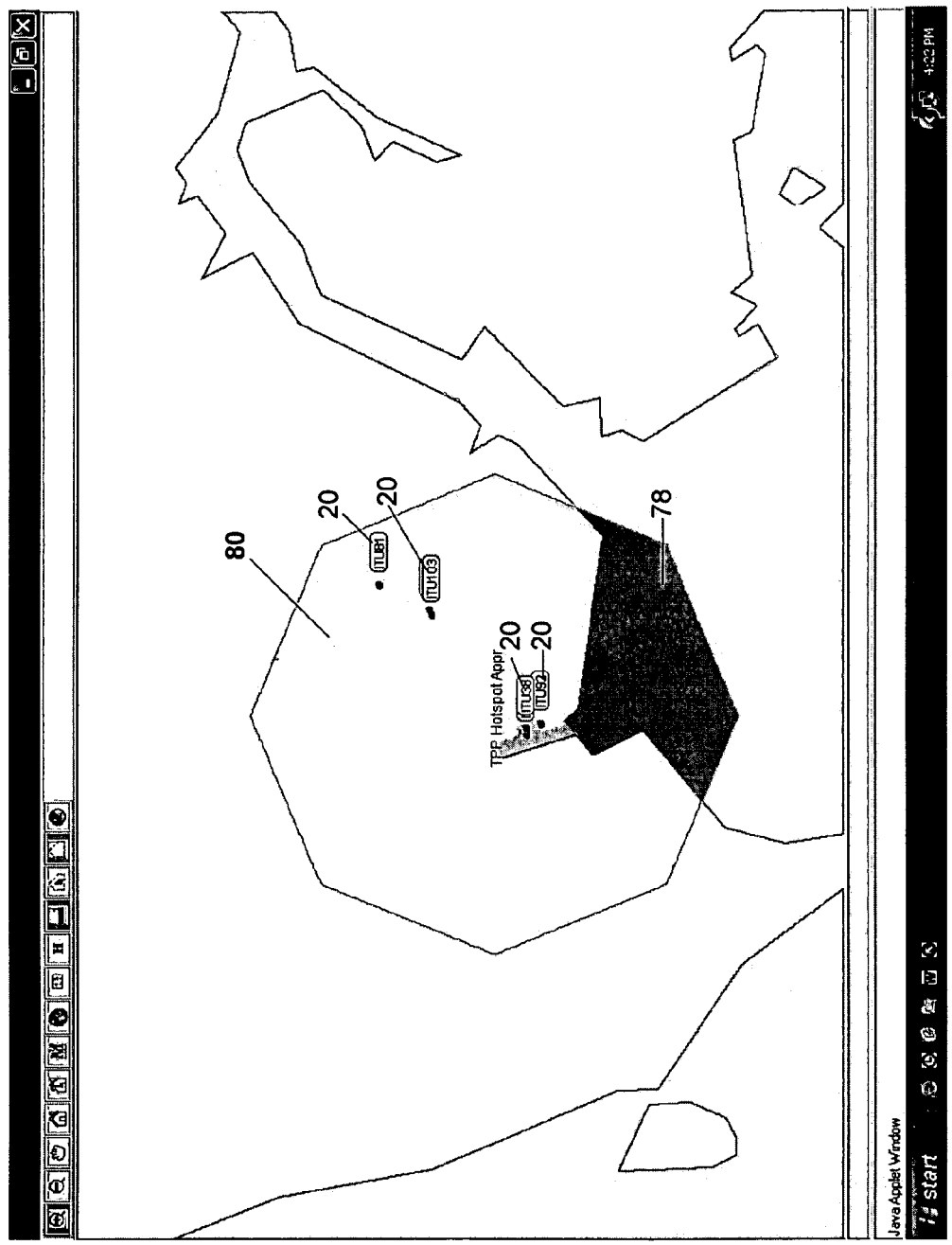
FIG. 9F is an example of a graphical user interface for displaying the location of onboard devices associated with a shipping order or purchases order in accordance with an embodiment of the invention.

FIG. 9F shows a graphical user display illustrating a map with the geographical location of active onboard devices mounted on containers that carry units of goods for a particular shipping order. A geofenced area 78 and an approach area 80 are shown as shadings on the map. The display provides a fast overview of the location of all units of goods for a shipping order. The display furthermore provides information of the level of security in the area of each container. The location of each onboard device 20 is captured in real-time by GPS readings transmitted to the central computer system.

Figure 9G:
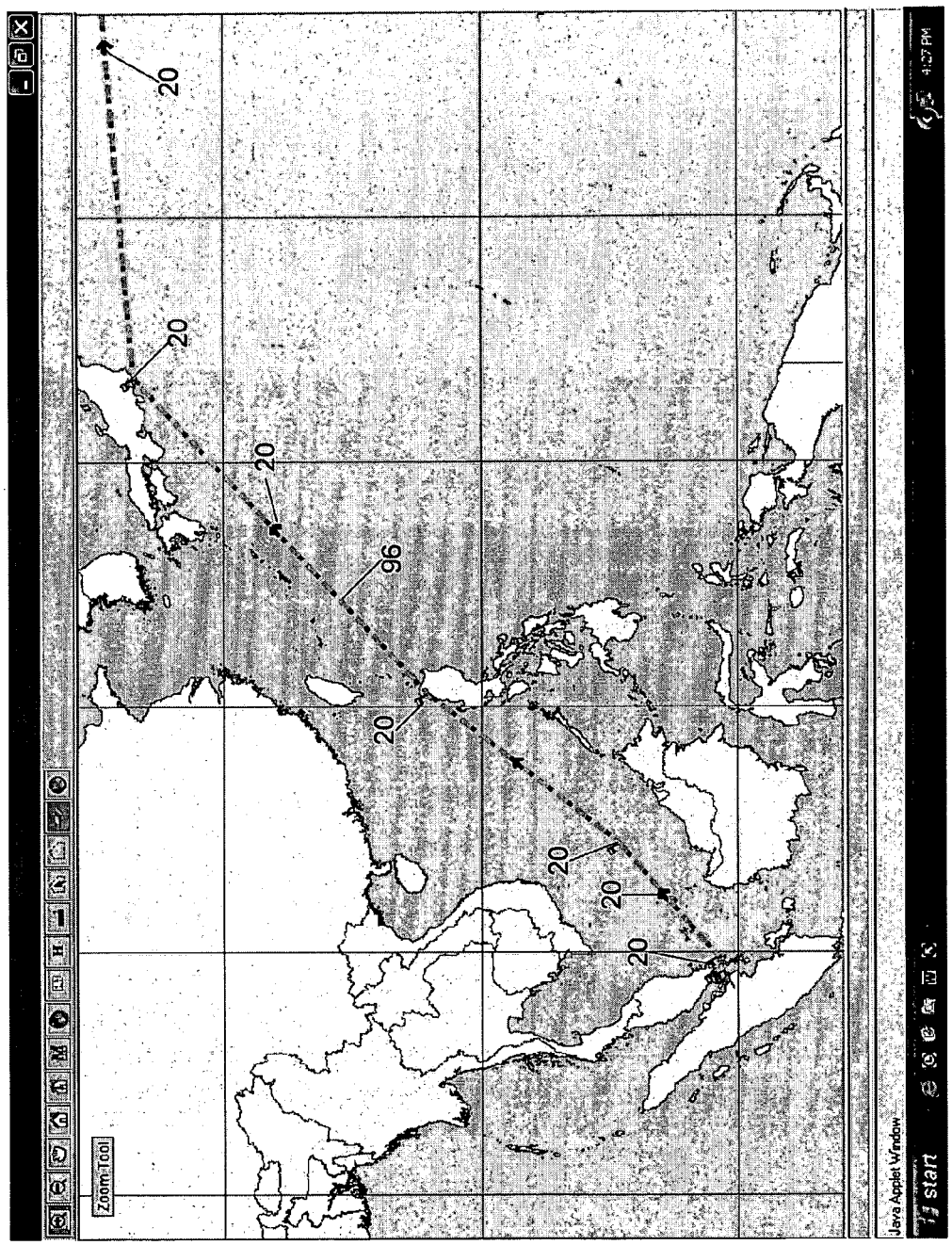
FIG. 9G is an example of a graphical user interface for displaying the planned and actual routing for a container tracked using an onboard device in accordance with an embodiment of the invention.

FIG. 9G shows a graphical user display illustrating a map with the actual path 95 of an onboard device 20 when in transit from origin to destination and the planned route 96 for the shipping of the container. The location of the onboard device is captured in real-time by GPS readings that are transmitted to the central computer system 24.

Figure 9H:
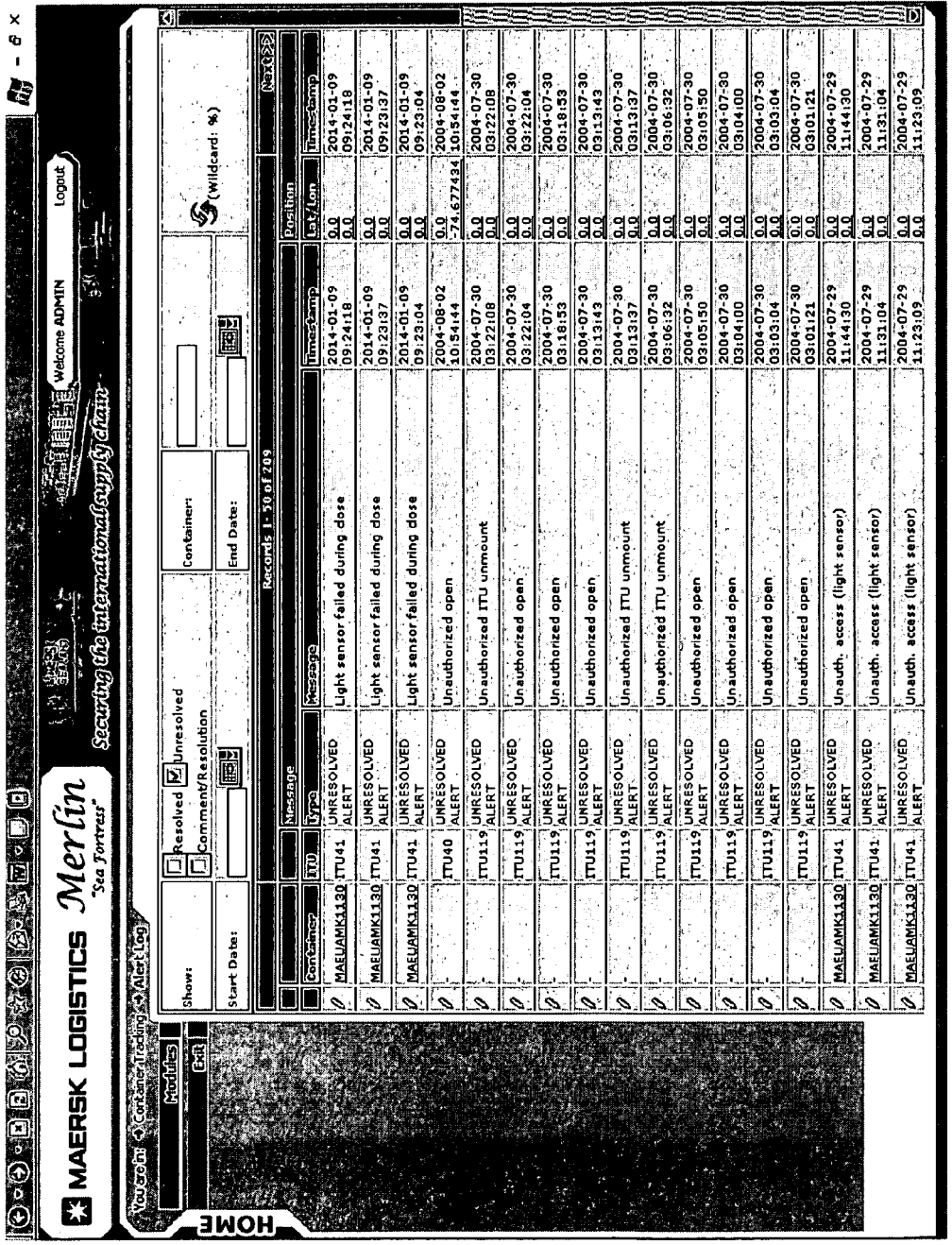
FIG. 9H is an example of a graphical user interface for displaying alerts generated by onboard devices in accordance with an embodiment of the invention.

FIG. 9H shows a graphical user display listing unresolved alerts created by the onboard devices monitored. The alerts are listed with date and time and location of occurrence and date and time of receipt in the central computer system. The list can be filtered to contain alerts according to chosen selection criteria as well as sorted to list the presented alerts in a specific order.

Figure 9I:
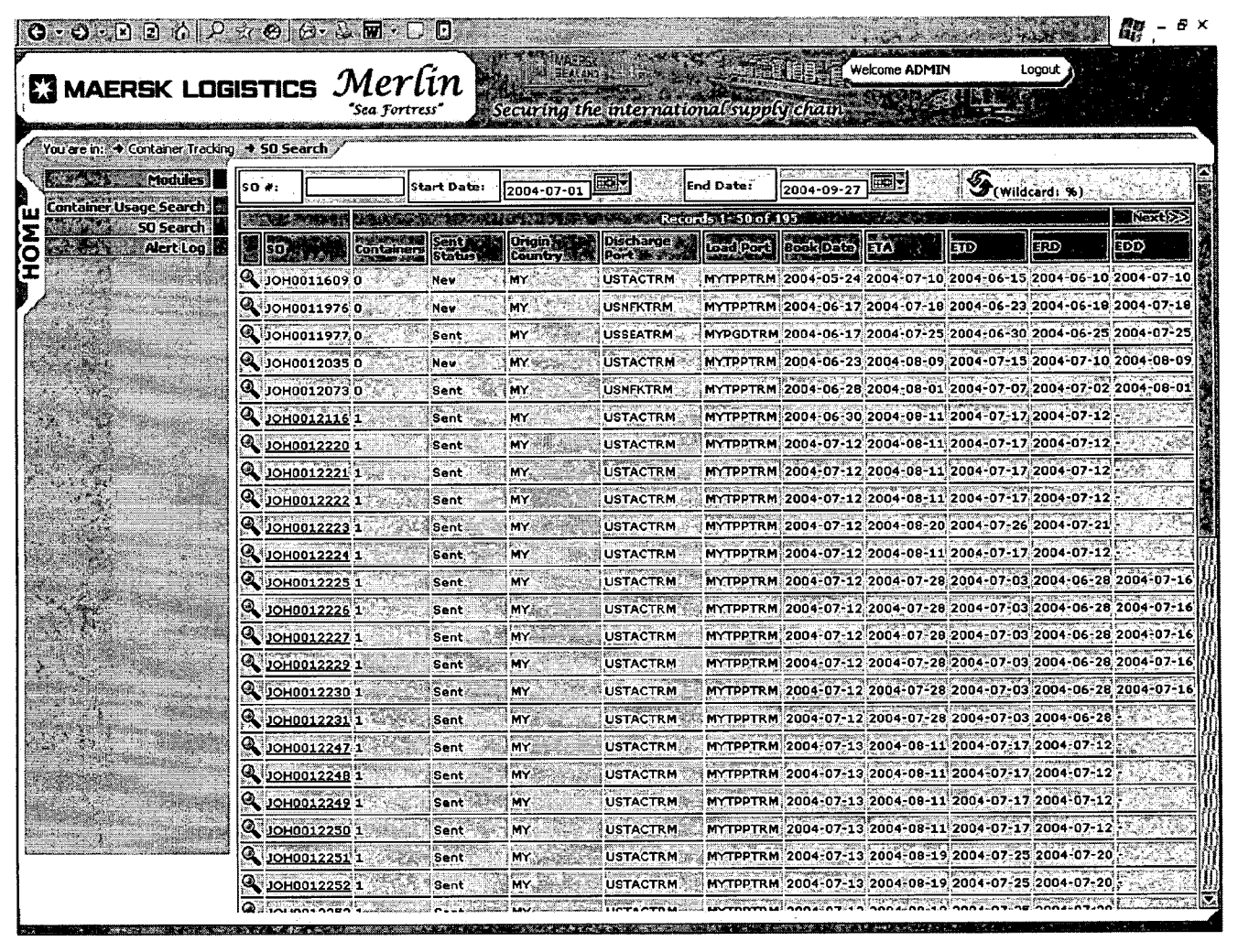

FIG. 9I shows a graphical user display listing shipping orders for which units of goods are shipped in containers having onboard devices. The shipping orders are listed with details of arrival, departure, receipt and delivery of units of goods and load and discharge ports.

Figure 9J:
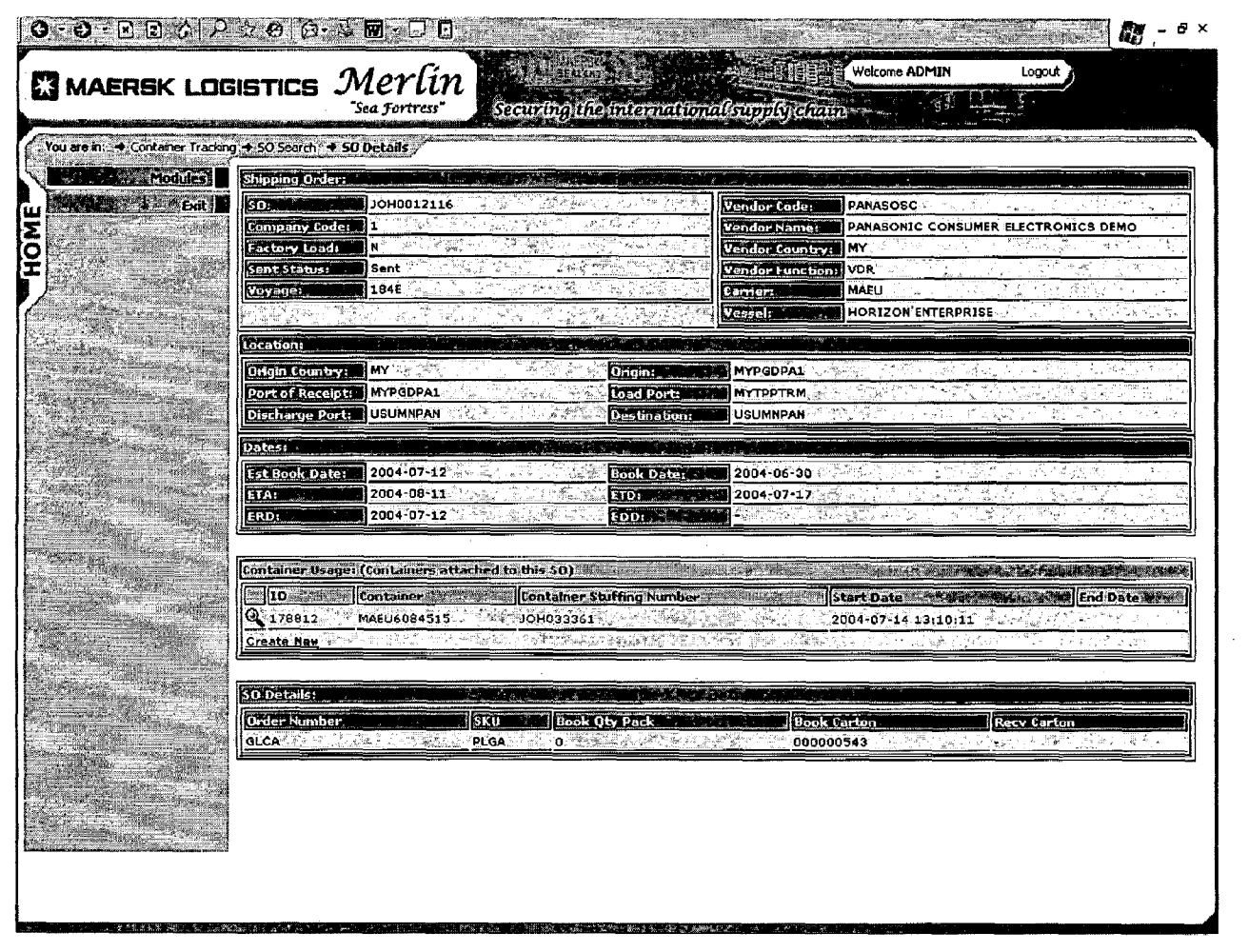

FIG. 9J shows a graphical user display listing details for a shipping order, selected from the listing shown in FIG. 9I. Details relating to the shipping order are displayed (e.g., vendor details, arrival, departure, receipt and delivery of unit of goods, container identification numbers).

Although the invention has been described with reference to a specific embodiment, it should be understood that various changes may be made without departing from the spirit or scope of the invention. For example, to facilitate explanation of the invention, the system has been described and illustrated in connection with a system comprising single system components (onboard device, handheld device, fixed communications device, central computer system, etc.). Systems in accordance with the invention will in most instances comprise multiple components (e.g., multiple onboard devices, handheld units, fixed communications devices, and workstations). Accordingly, the disclosed examples are intended to be illustrative of the scope of the invention and are not intended to be limiting. The scope of the invention is defined as set forth in the appended claims.

We claim:

1. A system for monitoring a container for transporting cargo, the system comprising:
   a. an onboard device attached to the container comprising:
      i. a processor/sensor component comprising:
         1. a processor for controlling the device;
         2. one or more sensors in communication with the processor for sensing container conditions;
         3. a satellite modem in communication with the processor for transmitting satellite communications comprising alerts relating to container conditions; and
         4. a connection to a power source;
         5. a cellular telephone modem for transmitting and receiving cellular telephone communications and the antenna unit further comprises a cellular telephone antenna; and
      ii. an antenna component connected to the process/sensor component, the antenna component comprising a satellite antenna connected to the satellite modem;
   b. a central computer system in communication with the onboard device for processing alerts received from the onboard device; and
   c. a fixed communications device for creating a communications hotspot to facilitate communications between the onboard device and the central computer system.

2. A system for monitoring a container for transporting cargo, the system comprising:
   a. an onboard device attached to the container comprising:
      i. a processor/sensor component comprising:
         1. a processor for controlling the device;
         2. one or more sensors in communication with the processor for sensing container conditions;
         3. a satellite modem in communication with the processor for transmitting satellite communications comprising alerts relating to container conditions; and
         4. a connection to a power source;
         5. a cellular telephone modem for transmitting and receiving cellular telephone communications and the antenna unit further comprises a cellular telephone antenna; and
      ii. an antenna component connected to the process/sensor component, the antenna component comprising a satellite antenna connected to the satellite modem;
   b. a central computer system in communication with the onboard device for processing alerts received from the onboard device; and
   c. a fixed communications device for creating a communications hotspot to facilitate communications between the onboard device and the central computer system; wherein the fixed communications device comprises:
      i. a processor for controlling the device,
      ii. a short-range wireless communications module for transmitting and receiving communications between the fixed communications device and the onboard device,
      iii. a cellular telephone modem and cellular telephone antenna for transmitting and receiving communications between the fixed communications device the central computer system via a computer network.

3. A system for monitoring a container for transporting cargo, the system comprising:
   a. an onboard device attached to the container comprising:
      i. a processor/sensor component comprising:
         1. a processor for controlling the device;
         2. one or more sensors in communication with the processor for sensing container conditions;
         3. a satellite modem in communication with the processor for transmitting satellite communications comprising alerts relating to container conditions; and
         4. a connection to a power source;
         5. a cellular telephone modem for transmitting and receiving cellular telephone communications and the antenna unit further comprises a cellular telephone antenna; and
      ii. an antenna component connected to the process/sensor component, the antenna component comprising a satellite antenna connected to the satellite modem;
   b. a central computer system in communication with the onboard device for processing alerts received from the onboard device; and
   c. a fixed communications device for creating a communications hotspot to facilitate communications between the onboard device and the central computer system; wherein the fixed communications device comprises:
      i. a processor for controlling the device,
      ii. a short-range wireless communications module for transmitting and receiving communications between the fixed communications device and the onboard device,
      iii. a cellular telephone modem and cellular telephone antenna for transmitting and receiving communications between the fixed communications device the central computer system via a computer network;
      iv. a handheld computing device in communication with the onboard device and central computer system, the handheld computing device controlling the mode of operation and/or updating the onboard device; wherein the cargo comprises a computer readable tag containing cargo information, and the handheld computing device further comprises a computer readable tag reader for reading the cargo information.

4. A system for monitoring a container for transporting cargo, the system comprising:
   a. an onboard device attached to the container comprising:
      i. a processor/sensor component comprising:
         1. a processor for controlling the device;
         2. one or more sensors in communication with the processor for sensing container conditions;
         3. a satellite modem in communication with the processor for transmitting satellite communications comprising alerts relating to container conditions; and
         4. a connection to a power source;
         5. a cellular telephone modem for transmitting and receiving cellular telephone communications and the antenna unit further comprises a cellular telephone antenna; and
         6. a memory for storing data relating to container conditions or position;

ii. an antenna component connected to the process/sensor component, the antenna component comprising a satellite antenna connected to the satellite modem;

b. a central computer system in communication with the onboard device for processing alerts received from the onboard device; and c. a fixed communications device for creating a communications hotspot to facilitate communications between the onboard device and the central computer system; wherein the fixed communications device comprises:

i. a processor for controlling the device, ii. a short-range wireless communications module for transmitting and receiving communications between the fixed communications device and the onboard device, iii. a cellular telephone modem and cellular telephone antenna for transmitting and receiving communications between the fixed communications device the central computer system via a computer network;

iv. a handheld computing device in communication with the onboard device and central computer system, the handheld computing device controlling the mode of operation and/or updating the onboard device; wherein the container has an identification number, and wherein the handheld computing device receives and correlates the container identification number and cargo information and transmits the correlated container identification number and cargo information to the central computer system.

5. A system for monitoring a container for transporting cargo, the system comprising:

a. an onboard device attached to the container comprising:

i. a processor/sensor component comprising:

1. a processor for controlling the device;
2. one or more sensors in communication with the processor for sensing container conditions;
3. a satellite modem in communication with the processor for transmitting satellite communications comprising alerts relating to container conditions; and
4. a connection to a power source;
5. a cellular telephone modem for transmitting and receiving cellular telephone communications and the antenna unit further comprises a cellular telephone antenna; and ii. an antenna component connected to the process/sensor component, the antenna component comprising a satellite antenna connected to the satellite modem;

b; a central computer system in communication with the onboard device for processing alerts received from the onboard device; and c. a fixed communications device for creating a communications hotspot to facilitate communications between the onboard device and the central computer system; wherein the fixed communications device comprises:

i. a processor for controlling the device, ii. a short-range wireless communications module for transmitting and receiving communications between the fixed communications device and the onboard device, iii. a cellular telephone modem and cellular telephone antenna for transmitting and receiving communications between the fixed communications device the central computer system via a computer network; and iv. a handheld computing device in communication with the onboard device and central computer system, the handheld computing device controlling the mode of operation and/or updating the onboard device; wherein the handheld device receives software updates from the central computer system and communicates the updates to the onboard device.

6. A system for monitoring and tracking a container for transporting cargo, the container having a container identification number and the cargo having a computer-readable tag containing cargo information, the system comprising:

a. an onboard device attached to the container comprising:

i. a processor/sensor component comprising:

1. a processor for controlling the device, wherein the processor is programmed to select a mode of communications from multiple modes of wireless communications comprising satellite communications, cellular telephone communications, and short-range wireless communications based upon one or more rules;
2. a memory in communication with the processor;
3. one or more sensors in communication with the processor for sensing container conditions;
4. a satellite modem in communication with the processor for transmitting satellite communications comprising alerts relating to container conditions;
5. a global positioning system (GPS) receiver in communication with the processor for determining the position of the device;
6. a short-range wireless communications module for transmitting and receiving short-range radio-frequency (RF) communications comprising alerts relating to container conditions;
7. cellular telephone modem in communication with the processor for transmitting and receiving cellular telephone communications comprising alerts relating to container conditions; and
8. a power connection for connecting to a rechargeable battery;

ii. an antenna component connected to the process/sensor component, the antenna component comprising:

1. a satellite antenna in communication with the satellite modem;
2. a GPS antenna in communication with the GPS receiver;
3. a short-range RF antenna in communication with the short-range wireless communications module;
4. a cellular telephone antenna in communication with the cellular telephone modem;

iii. a clamping component for attaching the device to the container; and iv. a solar panel for recharging the battery; and b. a central computer system in communication with the onboard device via a computer network, wherein the central computer system processes alerts received from the onboard device and tracks the position of the onboard device;

c. one or more fixed communications devices for creating a communications hotspot to facilitate communications between the onboard device and the central computer system, each fixed communications devices comprising:

i. a processor for controlling the fixed communication device;

ii. a short-range wireless communications module for transmitting and receiving short-range RF communications between the fixed communications device and the onboard device; and iii. cellular modem and cellular telephone antenna for transmitting and receiving communications between the fixed communications device and one or more external computing device via a computer network; and d. one or more handheld computing devices in communication with the onboard device via short-range RF signals and the central computer system via a wired or wireless connection to a computer network, the one or more handheld computing devices controlling the mode of operation and updating the onboard device, wherein at least one of the handheld computing devices comprises a computer readable tag reader for reading the cargo information, and wherein the handheld computing device receives and correlates the container identification number and cargo information and transmits the correlated container identification number and cargo information to the central computer system.

* * * * *